(12) United States Patent
Mori et al.

(10) Patent No.: US 11,565,698 B2
(45) Date of Patent: Jan. 31, 2023

(54) OBSTACLE DETECTION APPARATUS, AUTOMATIC BRAKING APPARATUS USING OBSTACLE DETECTION APPARATUS, OBSTACLE DETECTION METHOD, AND AUTOMATIC BRAKING METHOD USING OBSTACLE DETECTION METHOD

(71) Applicant: Mitsubishi Electric Corporation, Tokyo (JP)

(72) Inventors: Kohei Mori, Tokyo (JP); Hiroki Fujiyoshi, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 174 days.

(21) Appl. No.: 16/971,404

(22) PCT Filed: Apr. 16, 2018

(86) PCT No.: PCT/JP2018/015662
§ 371 (c)(1),
(2) Date: Aug. 20, 2020

(87) PCT Pub. No.: WO2019/202627
PCT Pub. Date: Oct. 24, 2019

(65) Prior Publication Data
US 2020/0391745 A1    Dec. 17, 2020

(51) Int. Cl.
*G06V 10/25*      (2022.01)
*G06V 10/75*      (2022.01)
*G06V 20/58*      (2022.01)
*B60W 30/18*      (2012.01)

(52) U.S. Cl.
CPC ....... *B60W 30/18109* (2013.01); *G06V 10/25* (2022.01); *G06V 10/758* (2022.01); *G06V 20/58* (2022.01); *B60W 2420/403* (2013.01); *B60W 2510/18* (2013.01)

(58) Field of Classification Search
CPC ..... B60W 30/18109; B60W 2420/403; B60W 2510/18; G06V 10/25; G06V 10/758; G06V 20/58; G06V 10/50; B60T 7/22; G06T 7/00
See application file for complete search history.

(56) References Cited

U.S. PATENT DOCUMENTS

| 6,169,572 B1 * | 1/2001 | Sogawa | G06V 20/58 |
| | | | 348/113 |
| 6,347,266 B1 * | 2/2002 | Kageyama | G01S 15/931 |
| | | | 701/25 |
| 10,522,039 B2 * | 12/2019 | Park | B60W 30/095 |

(Continued)

FOREIGN PATENT DOCUMENTS

JP    2017-033506 A    2/2017

*Primary Examiner* — Peter D Nolan
*Assistant Examiner* — Anwar Mohamed
(74) *Attorney, Agent, or Firm* — Sughrue Mion, PLLC; Richard C. Turner

(57) ABSTRACT

A histogram is calculated based on a road surface image of a portion around a vehicle, a running-allowed region in which the vehicle can run is detected based on the histogram, an obstacle region is extracted based on the running-allowed region, and a position of an obstacle in the obstacle region is detected, to further enhance the accuracy of detecting an obstacle around the vehicle as compared with conventional art.

16 Claims, 19 Drawing Sheets

(56) References Cited

U.S. PATENT DOCUMENTS

| | | | | |
|---|---|---|---|---|
| 2014/0168440 | A1* | 6/2014 | Tsuchiya | B60R 1/00 348/148 |
| 2015/0063630 | A1* | 3/2015 | Ryu | G06V 20/58 382/103 |
| 2015/0324972 | A1* | 11/2015 | Hayakawa | G06V 20/64 348/148 |
| 2016/0070265 | A1* | 3/2016 | Liu | G05D 1/0088 701/25 |
| 2017/0140229 | A1* | 5/2017 | Ogata | G06V 20/58 |
| 2018/0293450 | A1* | 10/2018 | Soga | G06V 20/584 |
| 2018/0336701 | A1* | 11/2018 | Yokota | G06T 7/74 |
| 2019/0118807 | A1* | 4/2019 | Takaki | B60W 30/09 |
| 2020/0148203 | A1* | 5/2020 | Taniguchi | G06T 1/00 |
| 2020/0189467 | A1* | 6/2020 | Kondo | G06T 11/00 |
| 2020/0211395 | A1* | 7/2020 | Feist | B60W 30/09 |
| 2020/0241549 | A1* | 7/2020 | Tsurumi | B60W 40/04 |
| 2020/0242943 | A1* | 7/2020 | Kuwabara | G08G 1/144 |
| 2020/0249347 | A1* | 8/2020 | Suzuki | G01S 15/931 |
| 2020/0298877 | A1* | 9/2020 | Takamatsu | G01S 13/931 |
| 2020/0302192 | A1* | 9/2020 | Ogata | G08G 1/16 |
| 2020/0324777 | A1* | 10/2020 | Kato | B62D 6/00 |
| 2020/0349366 | A1* | 11/2020 | Takemura | B60Q 9/00 |
| 2020/0377083 | A1* | 12/2020 | Kokaki | B60W 60/0016 |
| 2020/0391751 | A1* | 12/2020 | Fujiyoshi | G06T 7/136 |
| 2020/0398829 | A1* | 12/2020 | Kasai | G08G 1/168 |
| 2020/0412990 | A1* | 12/2020 | Akahori | H04N 5/374 |
| 2021/0018611 | A1* | 1/2021 | Chhabra | G06K 9/6263 |
| 2021/0019536 | A1* | 1/2021 | Motoyama | G01C 21/3807 |
| 2021/0019553 | A1* | 1/2021 | Tani | G10L 17/26 |
| 2021/0256728 | A1* | 8/2021 | Ikeda | G01S 5/14 |
| 2021/0268652 | A1* | 9/2021 | Narayana | G01C 21/20 |
| 2022/0019810 | A1* | 1/2022 | Farber | G06K 9/627 |

\* cited by examiner 15  16

| | SHORTEST COLLISION TIME [SECOND] | | |
|---|---|---|---|
| | 0≦t≦0.4 | 0.4<t≦0.8 | 0.8<t |
| TARGET DECELERATION [G] | 0.8[G] | 0.4[G] | 0[G] (NO BRAKING) |

FIG. 29

| | | SHORTEST COLLISION TIME [SECOND] | | |
|---|---|---|---|---|
| | KIND OF OBSTACLE | 0≦t≦0.4 | 0.4<t≦0.8 | 0.8<t |
| TARGET DECELERATION [G] | PERSON·MOTOR CYCLE | 0.9[G] | 0.8[G] | 0[G] (NO BRAKING) |
| | VEHICLE (OTHER THAN MOTORCYCLE) | 0.8[G] | 0.6[G] | 0[G] (NO BRAKING) |
| | OTHER OBSTACLES | 0.8[G] | 0.4[G] | 0[G] (NO BRAKING) |

OBSTACLE DETECTION APPARATUS, AUTOMATIC BRAKING APPARATUS USING OBSTACLE DETECTION APPARATUS, OBSTACLE DETECTION METHOD, AND AUTOMATIC BRAKING METHOD USING OBSTACLE DETECTION METHOD

CROSS REFERENCE TO RELATED APPLICATIONS

This application is a National Stage of International Application No. PCT/JP2018/015662 filed Apr. 16, 2018.

TECHNICAL FIELD

The present disclosure relates to an obstacle detection apparatus, an automatic braking apparatus using the obstacle detection apparatus, an obstacle detection method, and an automatic braking method using the obstacle detection method.

BACKGROUND ART

To date, a technique for detecting a road surface using a camera and extracting a candidate obstacle has been known as an obstacle detection apparatus (for example, see Patent Document 1).

CITATION LIST

Patent Document

Patent Document 1: Japanese Laid-Open Patent Publication No. 2017-33506

SUMMARY OF THE INVENTION

Problems to be Solved by the Invention

As described in Patent Document 1, the conventional obstacle detection apparatus uses a manner in which a brightness range of a road surface and a brightness range of a white line are estimated, and a place other than the ranges is determined as a region of an obstacle. Therefore, the accuracy of detecting an obstacle on a road is high on, for example, an asphalt road surface having no pattern on the road surface. However, in this manner, a brightness range of a road surface is preset, and, therefore, a problem arises that a line drawn on a road surface with a color other than that of a white line, characters, signs, and a manhole, an underground fire hydrant, and the like disposed in a road surface may be erroneously detected as an obstacle other than a road surface into which a vehicle can run, even on an asphalt road surface. Furthermore, a pattern on a road surface is erroneously detected as an obstacle on, for example, a stone pavement or a grassy road other than an asphalt road surface.

The present disclosure has been made in order to solve the aforementioned problem, and an object of the present disclosure is to provide an obstacle detection apparatus that further enhances the accuracy of detecting an obstacle as compared with conventional art.

Solution to the Problems

An obstacle detection apparatus according to the present disclosure includes:

an obstacle distance detection unit, disposed in a vehicle, for detecting an obstacle distance between the vehicle and an obstacle around the vehicle;

an imaging unit, disposed in the vehicle, for taking a road surface image of a portion around the vehicle, and outputting the road surface image;

an image transform unit for transforming a coordinate of the road surface image and outputting a result as a coordinate transform image;

a histogram generation region image extraction unit for extracting, as a histogram generation region image, an image of a predetermined region that does not reach the obstacle distance in the coordinate transform image;

a histogram calculation unit for calculating a histogram in the histogram generation region image;

a first running-allowed region detection unit for detecting a first running-allowed region in which the vehicle can run, in the coordinate transform image, based on the coordinate transform image and the histogram;

an obstacle region extraction unit for extracting an obstacle region in the coordinate transform image based on the first running-allowed region; and an obstacle position detection unit for detecting a position of the obstacle relative to the vehicle based on the obstacle region, and outputting the position as obstacle position information.

Effect of the Invention

The obstacle detection apparatus according to the present disclosure can further enhance the accuracy of detecting an obstacle as compared with conventional art.

BRIEF DESCRIPTION OF THE DRAWINGS

FIG. 28 illustrates the shortest collision time and a target deceleration in a standard automatic braking apparatus.

FIG. 29 illustrates the shortest collision time and a target deceleration in the automatic braking apparatus according to embodiment 2.

DESCRIPTION OF EMBODIMENTS

Figure 1A:
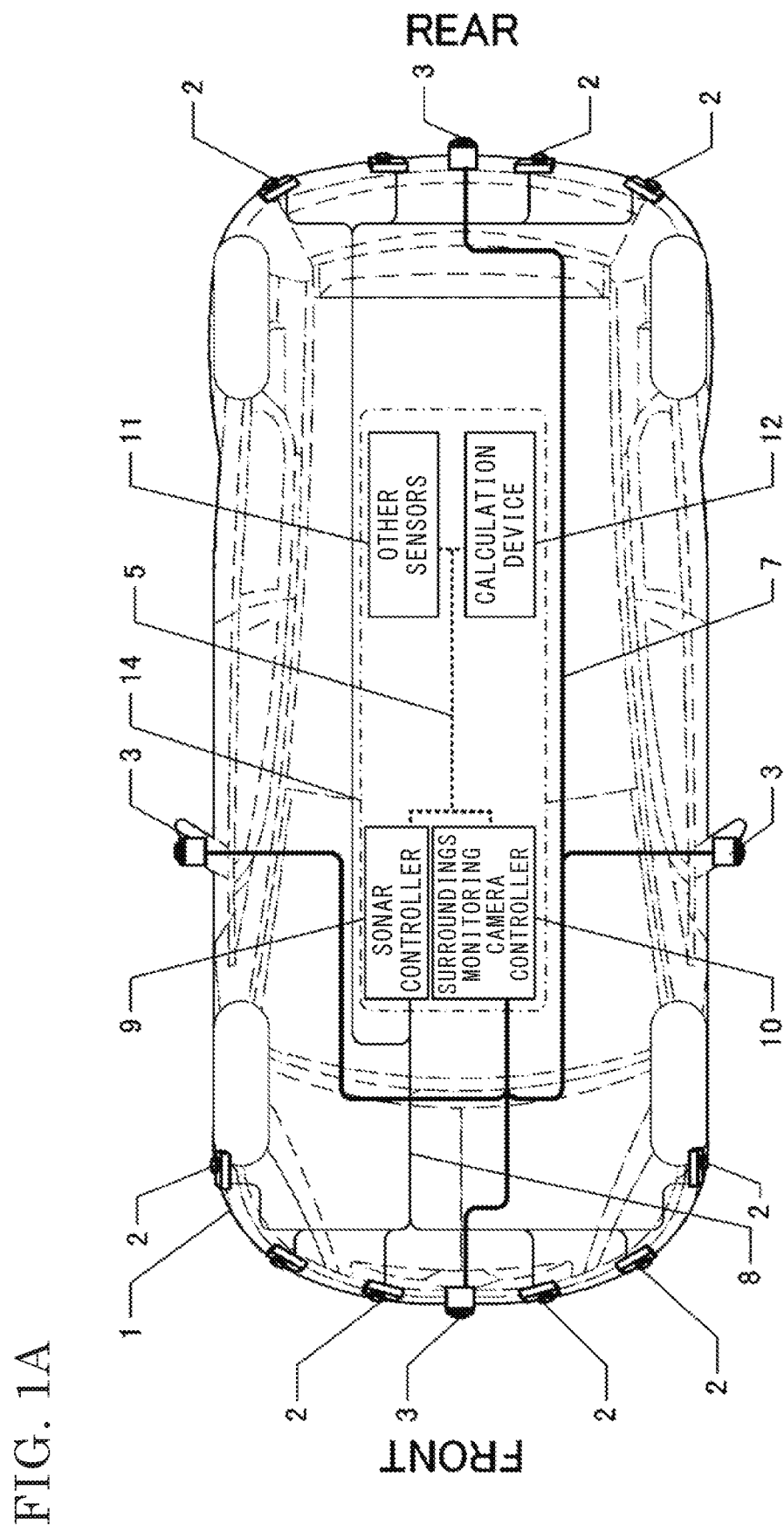
FIG. 1A is a schematic diagram illustrating a configuration of an obstacle detection apparatus according to embodiment 1.

Embodiments of the present disclosure will be described below with reference to the accompanying drawings. Throughout the drawings, the same reference character denotes the same or equivalent component or portion.

Embodiment 1

An obstacle detection apparatus of embodiment 1 will be described with reference to FIG. 1. FIG. 1 illustrates a configuration of the obstacle detection apparatus.

In FIG. 1A, a vehicle 1 has sonar sensors 2, cameras 3, and a road surface detection device 14. A plurality of the sonar sensors 2 are disposed at the front, rear, left, and right portions of the vehicle. The sonar sensors 2 are connected to a sonar controller 9 via sonar sensor wiring 8. In FIG. 1A, four sonar sensors 2 are disposed at each of the front and rear portions, and one sonar sensor 2 is further disposed at each of the left and right portions. However, in the present disclosure, there is no problem as long as at least one sonar sensor 2 is disposed in the direction in which a road surface image is obtained by the camera 3. A plurality of the cameras 3 are disposed at the front and rear portions and the left and right portions of the vehicle, and are connected to a surroundings monitoring camera controller 10 via camera wiring 7. In FIG. 1A, one camera 3 is disposed at each of the front, rear, left, and right portions. However, at least one camera 3 may be minimally disposed only in the direction in which the road surface detection device performs the detection. For example, in an automatic braking apparatus described below in the present disclosure, in a case where automatic braking is performed with respect to an obstacle located at the front, at least one camera 3 may be minimally disposed at the front portion of the vehicle 1, and, in a case where the automatic braking apparatus is performed with respect to an obstacle located at the rear, at least one camera 3 may be minimally disposed at the rear portion of the vehicle 1. In a case where the cameras 3 are mounted at the left and right portions of the vehicle 1, the cameras 3 can be used for the automatic braking apparatus that makes a warning for preventing an obstacle from being caught or that prevents an obstacle from being caught when the vehicle 1 turns. In FIG. 1A, the left and right cameras are each mounted below a door mirror, which is a typical mounting portion at present, and the front and rear cameras are each disposed at the center of a bumper. However, the cameras may not necessarily be mounted as shown in FIG. 1A. The camera can be mounted at any position as long as the object of the present disclosure can be achieved. The road surface detection device 14 includes other sensors 11 and a calculation device 12 of the road surface detection device as well as the sonar controller 9 and the surroundings monitoring camera controller 10. These components are connected to each other by a communication line 5 such as a CAN (Control Area Network).

Figure 1B:
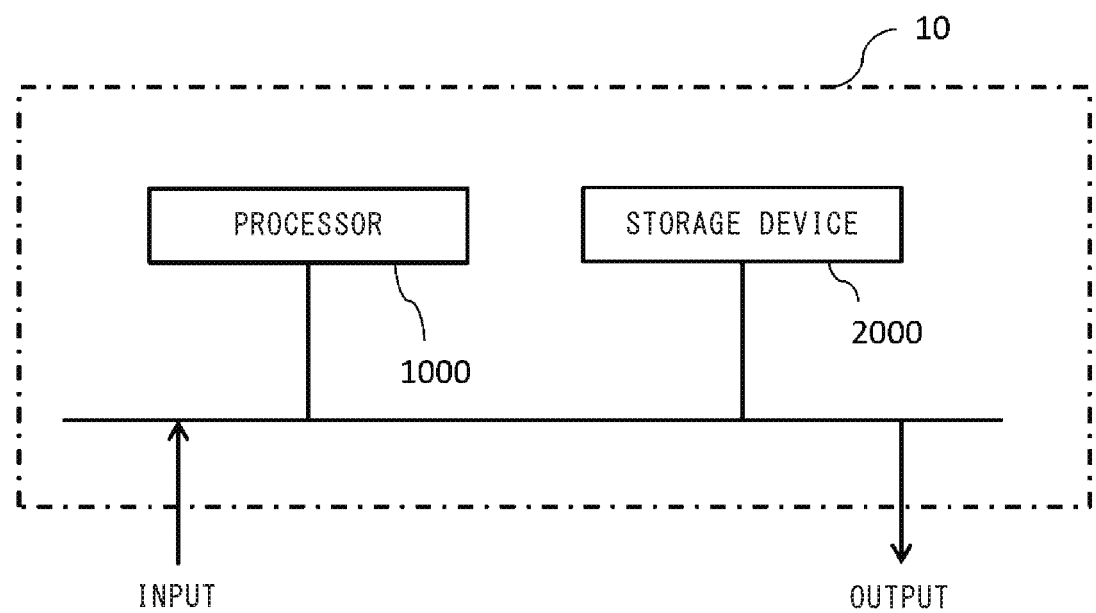
FIG. 1B illustrates a hardware configuration of the obstacle detection apparatus according to embodiment 1.

The calculation device 12 includes a processor 1000 and a storage device 2000, as shown in FIG. 1B. The storage device includes a volatile storage device such as a random access memory, and a non-volatile auxiliary storage device such as a flash memory, which are not shown. Instead of the flash memory, an auxiliary storage device as a hard disk may be provided. The processor 1000 executes a program inputted from the storage device 2000, to implement the configuration for a functional block illustrated in FIG. 2 and perform a part or the entirety of the operation in a flow chart shown in FIG. 3. In this case, the program is inputted to the processor 1000 from the auxiliary storage device through the volatile storage device. Furthermore, the processor 1000 may output data such as input and output signals, an intermediate value of calculation, and the calculation result, to the volatile storage device of the storage device 2000, or may store the data in the auxiliary storage device through the volatile storage device. In addition to the processor 1000 and the storage device 2000, a logic circuit and an analog circuit may also be used in combination. The calculation device 12 implements the functional block and performs a part or the entirety of the operation in a flow chart as described below in embodiment 2.

Next, a functional configuration of the obstacle detection apparatus according to embodiment 1 will be described with reference to a functional block diagram in FIG. 2, and, furthermore, an operation of the functional configuration will be described with reference to the flow chart in FIG. 3.

Figure 2:
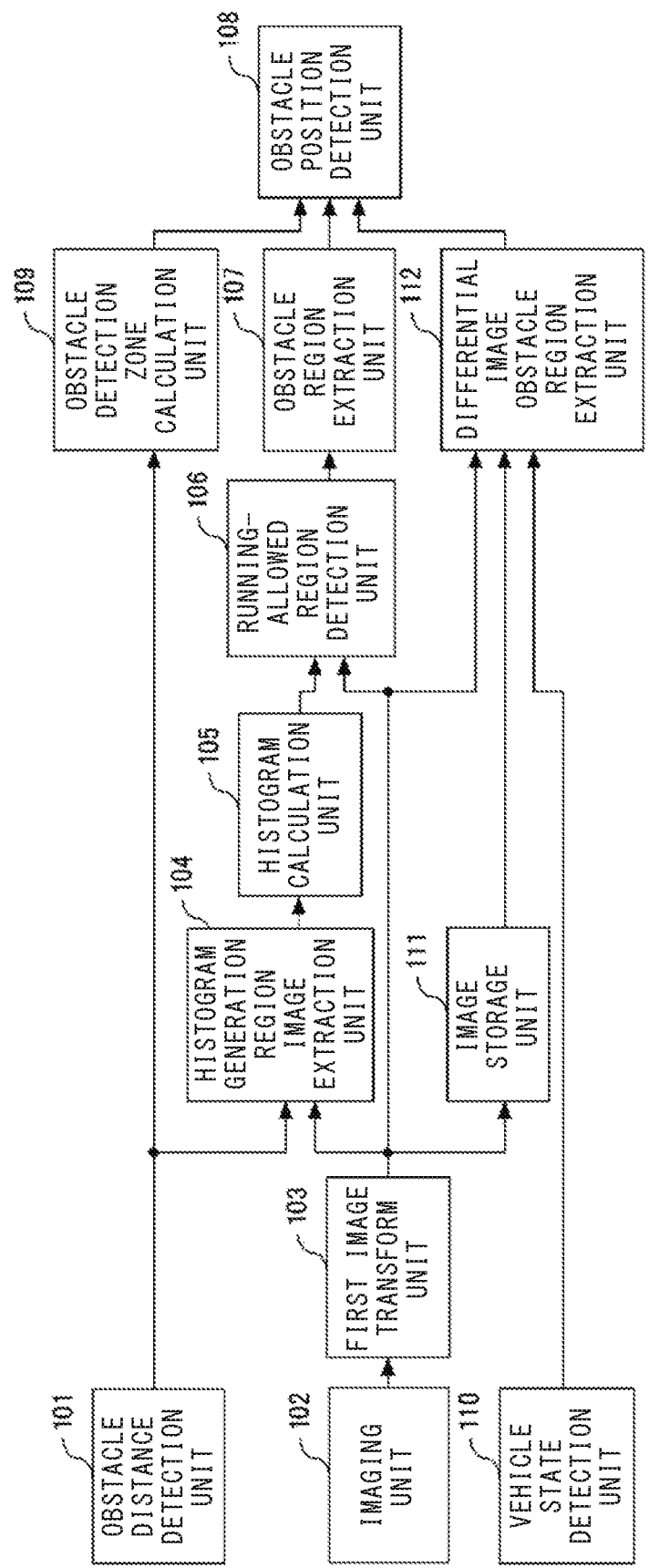
FIG. 2 is a functional block diagram illustrating the obstacle detection apparatus according to embodiment 1.

The road surface detection device 14 of embodiment 1 includes an obstacle distance detection unit 101, an imaging unit 102, a first image transform unit 103, a histogram generation region image extraction unit 104, a histogram calculation unit 105, a running-allowed region detection unit 106, an obstacle region extraction unit 107, an obstacle position detection unit 108, an obstacle detection zone calculation unit 109, a vehicle state detection unit 110, an image storage unit 111, and a differential image obstacle region extraction unit 112 as shown in FIG. 2. In particular, three outputs from the obstacle region extraction unit 107, the obstacle detection zone calculation unit 109, and the differential image obstacle region extraction unit 112 are inputted to the obstacle position detection unit 108. An obstacle is detected based on the inputs. These functions are repeatedly operated periodically according to the flow chart in FIG. 3.

Firstly, an operation up to extraction of an obstacle region will be described.

Figure 3:
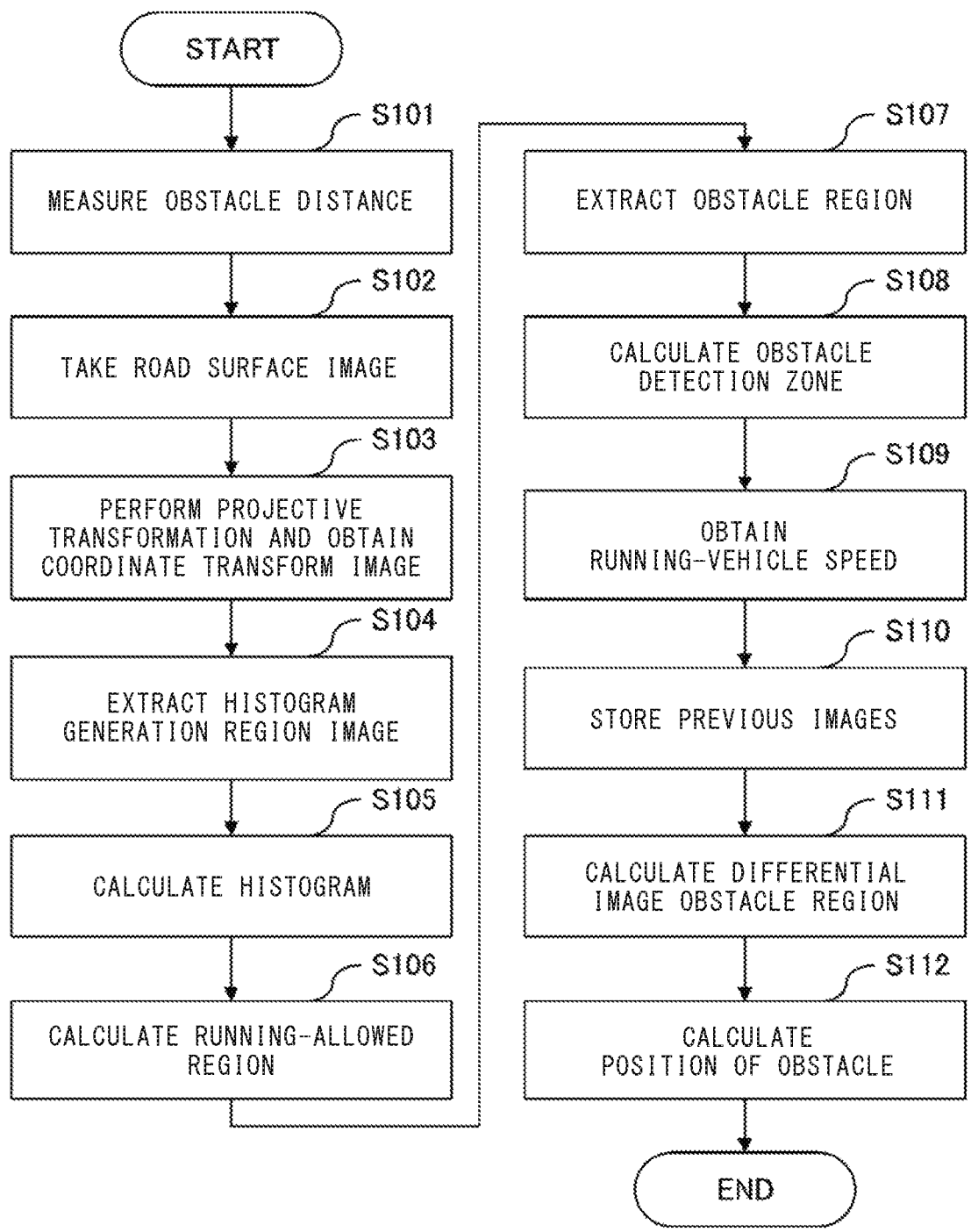
FIG. 3 is a flow chart showing an operation of the obstacle detection apparatus according to embodiment 1.

In FIG. 3, in step S101, the obstacle distance detection unit 101 shown in FIG. 2 measures and outputs an obstacle distance. In embodiment 1, the obstacle distance detection unit 101 includes the sonar sensor 2, the sonar controller 9, and the sonar sensor wiring 8 connecting therebetween. The obstacle distance detection unit 101 outputs, as an obstacle distance, a distance from the sonar sensor 2 to an obstacle closest to the sonar sensor 2. As a sensor capable of measuring the obstacle distance, for example, a millimeter wave sensor, an infrared sensor, and a laser sensor, in addition to the sonar sensor, may be used without affecting the effect of the present disclosure.

Next, in FIG. 3, in step S102, the imaging unit 102 shown in FIG. 2 outputs an image taken by the camera 3 as a road surface image. The imaging unit 102 includes the camera 3, the surroundings monitoring camera controller 10, and the camera wiring 7 connecting therebetween as shown in FIG. 1. In embodiment 1, as described above, there is no problem as long as at least one sonar sensor 2 is disposed in the obstacle distance detection unit 101 and at least one camera 3 is disposed in the imaging unit 102, in the direction of the road surface to be detected by the road surface detection device. However, in a case where the present disclosure is used for another purpose, the camera 3 is set so as to take an image of a road surface according to the purpose, and the necessary number of the sonar sensors 2 need to be disposed according to the camera 3. For example, in a case where an obstacle is to be avoided in the front-rear direction, the cameras 3 may be disposed in the front direction and the rear direction, respectively, and at least one sonar sensor 2 may be disposed in at least one of the front and the rear directions. In a case where an obstacle is to be detected in the entire periphery of the vehicle 1, the number of the cameras 3 may be set so as to take an image of the entire periphery of the vehicle 1 and at least one sonar sensor 2 may be disposed in the direction of at least one of the cameras 3.

In FIG. 3, in step S103, the first image transform unit 103 shown in FIG. 2 performs coordinate transformation of the road surface image outputted by the imaging unit 102 to a coordinate transform image.

Figure 4:
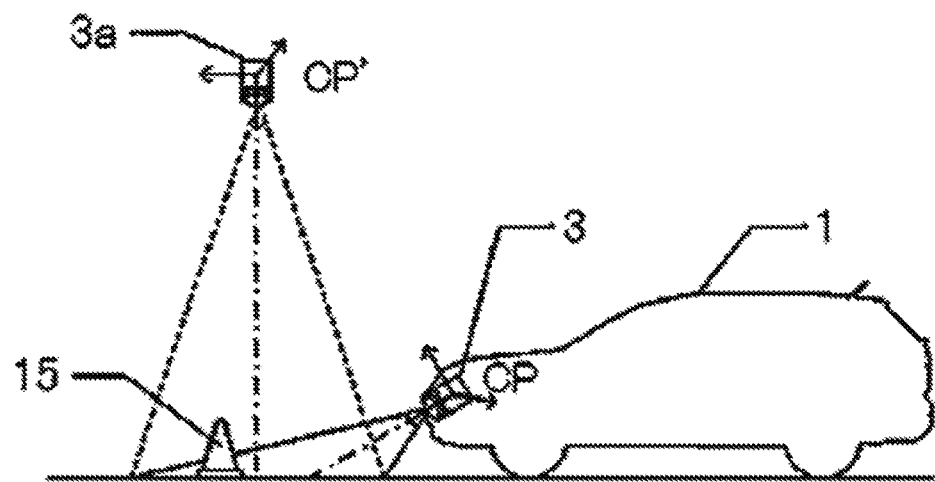
FIG. 4 illustrates a relationship between a front camera 3, a range of a road surface image, and a virtual camera 3a used for taking a coordinate transform image, in the obstacle detection apparatus according to embodiment 1.
Figure 5:
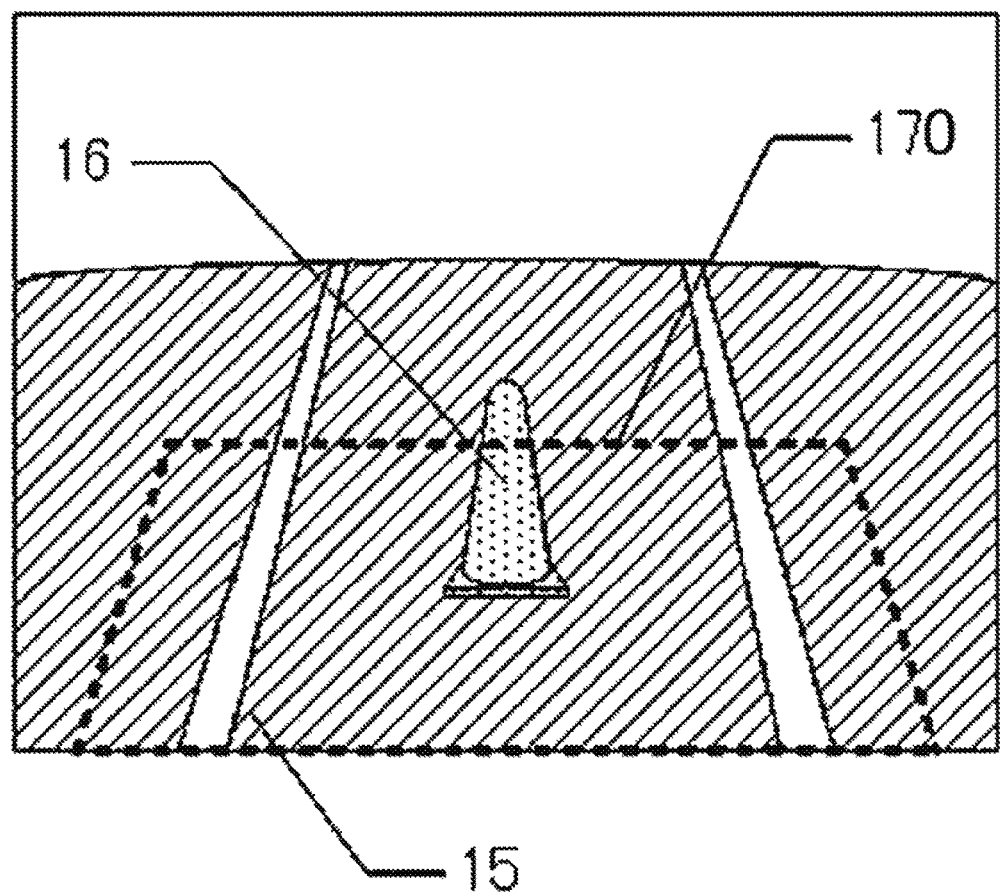
FIG. 5 illustrates a road surface image obtained from the camera 3 of the obstacle detection apparatus according to embodiment 1.
Figure 6:
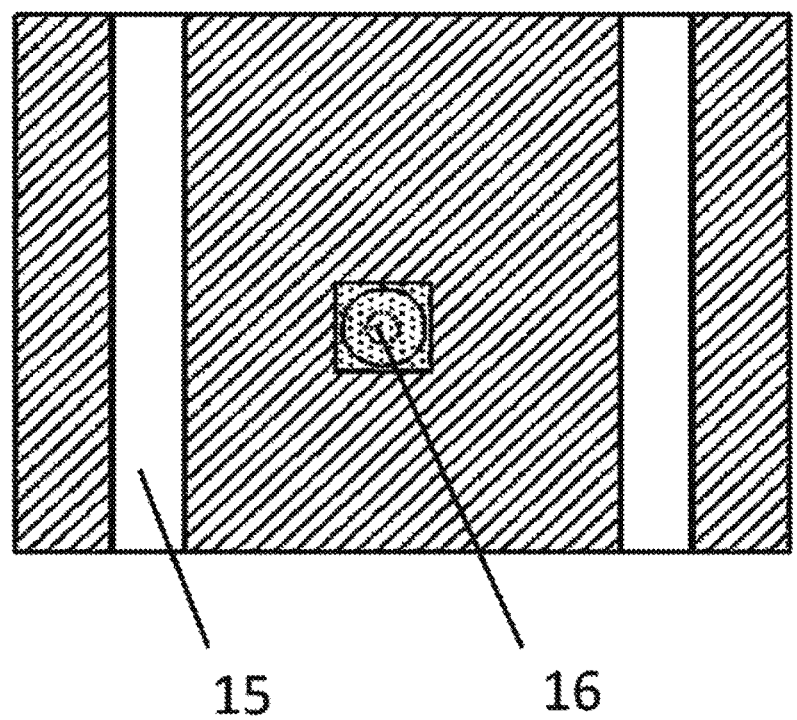
FIG. 6 illustrates an ideal coordinate transform image obtained from the camera 3a of the obstacle detection apparatus according to embodiment 1.

The coordinate transformation of a road surface image which is performed by the first image transform unit 103 will be described with reference to FIG. 4 to FIG. 7. FIG. 4 shows a relationship between the vehicle 1 having the camera 3 mounted at the front portion of the vehicle 1, the camera 3 that is actually mounted to the vehicle 1, a range of a road surface image taken at a position CP of the camera 3, a range of a coordinate transform image obtained from the road surface image by projective transformation, and a position CP' of a virtual camera 3a necessary for taking the coordinate transform image. In a case where the camera 3 is mounted at the front portion of the vehicle so as to take an image of a road surface, the camera 3 can obtain a road surface image as shown in FIG. 5. The road surface image in FIG. 5 includes white lines 15 drawn on an asphalt road surface and a pylon 16 that is an obstacle on the asphalt road surface. In FIG. 5, in a case where an image of a dotted line range 170 is taken from the direction of zenith by the camera 3a, an image as shown in FIG. 6 is obtained (the vehicle 1 is in the lower direction in FIG. 6). However, the camera 3a in the direction of zenith does not actually exist. Therefore, the image as viewed from the direction of zenith is obtained by the coordinate transformation from the road surface image (FIG. 5) taken by the camera 3.

Figure 7:
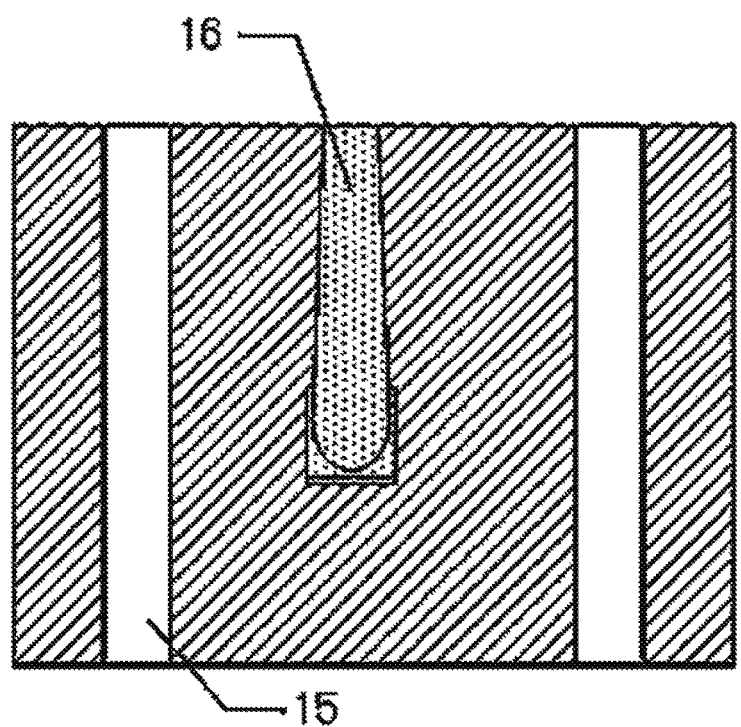
FIG. 7 illustrates an actual coordinate transform image obtained by transforming a road surface image obtained from the camera 3 of the obstacle detection apparatus according to embodiment 1.

A method for transforming an image obtained at the position CP of the camera 3 to an image obtained at the position CP' of another camera 3a is generally called projective transformation, and the transformation can be geometrically performed based on a relationship between the position CP and the position CP' relative to a road surface. However, the image is actually obtained, by using the projective transformation, as an image as shown in FIG. 7, not as the image as shown in FIG. 6. This is because, in the projective transformation of the road surface image in FIG. 5 which is obtained by the camera 3, the height of the obstacle in the image cannot be obtained by the single camera 3. Therefore, in a case where the projective transformation of the road surface image is performed, even an obstacle (for example, the pylon 16), in the road surface image, having a height is handled as a pattern (for example, the white line 15 on an asphalt road surface), on the road surface, having no height, and, thus, the pylon 16 is transformed so as to be elongated from the vehicle 1 in the depth direction in FIG. 7. In embodiment 1, the image shown in FIG. 7 is referred to as a coordinate transform image of the road surface image in FIG. 5. Thus, in FIG. 3, in step S103, the first image transform unit 103 shown in FIG. 2 performs coordinate transformation of the road surface image to the coordinate transform image, and outputs the coordinate transform image.

In FIG. 3, in step S104, the histogram generation region image extraction unit 104 shown in FIG. 2 extracts a histogram generation region image. The histogram generation region image extraction unit 104 will be described with reference to FIG. 8 to FIG. 10.

Figure 8:
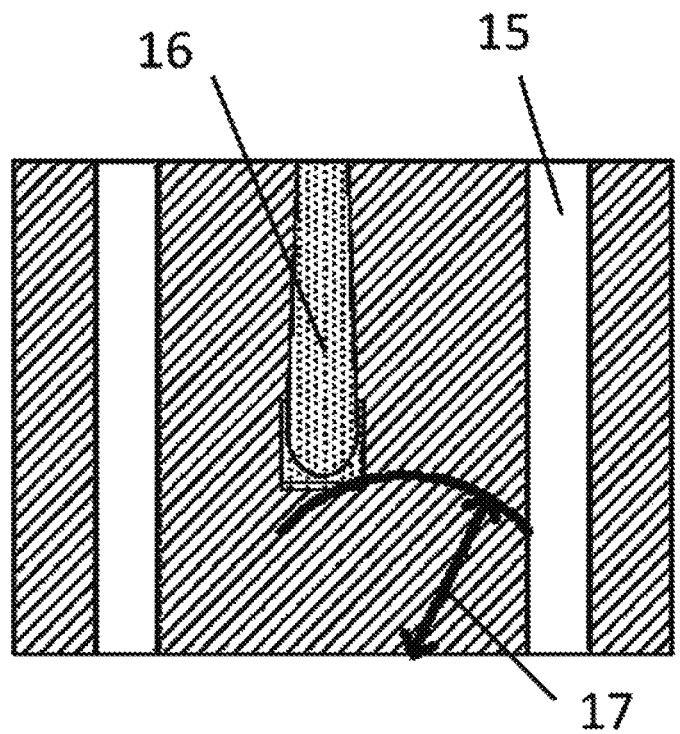
FIG. 8 illustrates a relationship between an obstacle detection distance and an obstacle in a coordinate transform image in the obstacle detection apparatus according to embodiment 1.

The histogram generation region image extraction unit 104 extracts a histogram generation region image from the coordinate transform image and an obstacle detection distance. FIG. 8 shows a relationship between the coordinate transform image and the obstacle detection distance. For example, in a case where the pylon 16 as an obstacle is in the coordinate transform image, an obstacle detection distance 17 is as shown in FIG. 8. The sonar sensor 2 is positioned at the lower side portion of the obstacle detection distance 17 in FIG. 8. The obstacle detected by the sonar sensor 2 is at a position on an arc distant from the position of the sonar sensor 2 over the obstacle detection distance 17. In FIG. 8, the pylon 16 corresponds to an obstacle detected by the sonar sensor 2. At this time, the obstacle detected by the sonar sensor 2 is only an obstacle having a height. Although an obstacle such as the pylon 16 having a height is detected, the white lines 15 on the asphalt road surface are not detected.

The histogram generation region image extraction unit 104 obtains a histogram generation region from the obstacle detection distance 17. The histogram generation region is an area indicated by an alternate long and two short dashes line 18 in FIG. 9, and is set between the vehicle 1 and the pylon 16 as the obstacle. The histogram generation region image extraction unit 104 outputs an image of the histogram generation region in the coordinate transform image as the histogram generation region image.

An example of a method for setting the histogram generation region will be described. An area having 0.8 times the length of the obstacle detection distance 17 in the upward direction from the center of the lower end, in FIG. 9, of the coordinate transform image and the length corresponding to at least half the width of the vehicle 1 in the left-right direction from the center thereof, may be set. This is because, according to embodiment 1, a position at which the camera 3 is mounted is the center of the front portion of the vehicle 1 as shown in FIG. 1A and FIG. 4, and a road surface, up to the obstacle in front of the vehicle 1, which does not include the pylon 16 as the obstacle and includes the white lines 15 on both sides of the vehicle can be outputted as the histogram generation region image by setting such a histogram generation region.

The value of 0.8 times the obstacle detection distance 17 as described above is determined based on the characteristics of the obstacle distance detection unit that detects an obstacle. In the sonar sensor 2 of embodiment 1, the beam angle is assumed to be about ±30 degrees, and a distance to an obstacle positioned at up to ±30 degrees relative to the front of the sonar sensor 2 can be measured. If an obstacle is displaced from the front of the sonar sensor 2 by 30 degrees, a distance of a straight line connecting between the vehicle 1 and the obstacle is such that the obstacle is distant from the vehicle 1 in the perpendicular direction (position in the horizontal direction is unclear) by 0.86 times the obstacle detection distance according to the obstacle detection distance and a value of cos 30 degrees. Therefore, the value is set to be 0.8 times the obstacle detection distance which is less than 0.86 times in consideration of a margin for detection deviation or the like. Thus, even when the obstacle is deviated from the front of the sonar sensor 2 by 30 degrees, the histogram generation region that does not include an obstacle can be set. In a case where a sensor, other than the sonar sensor, having a high directivity is used, the value is closer to 1.0. In a case where a sonar sensor having a low directivity is used, the beam angle is increased and the value is less than 0.8.

Figure 9:
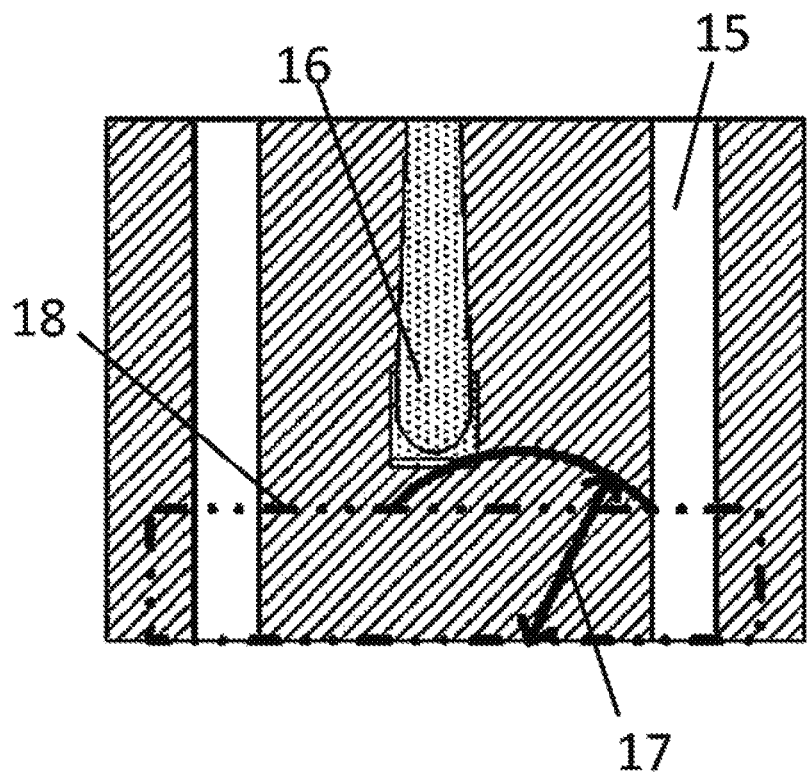
FIG. 9 illustrates a relationship between a histogram generation region and an obstacle detection distance in a coordinate transform image in the obstacle detection apparatus according to embodiment 1.
Figure 10:
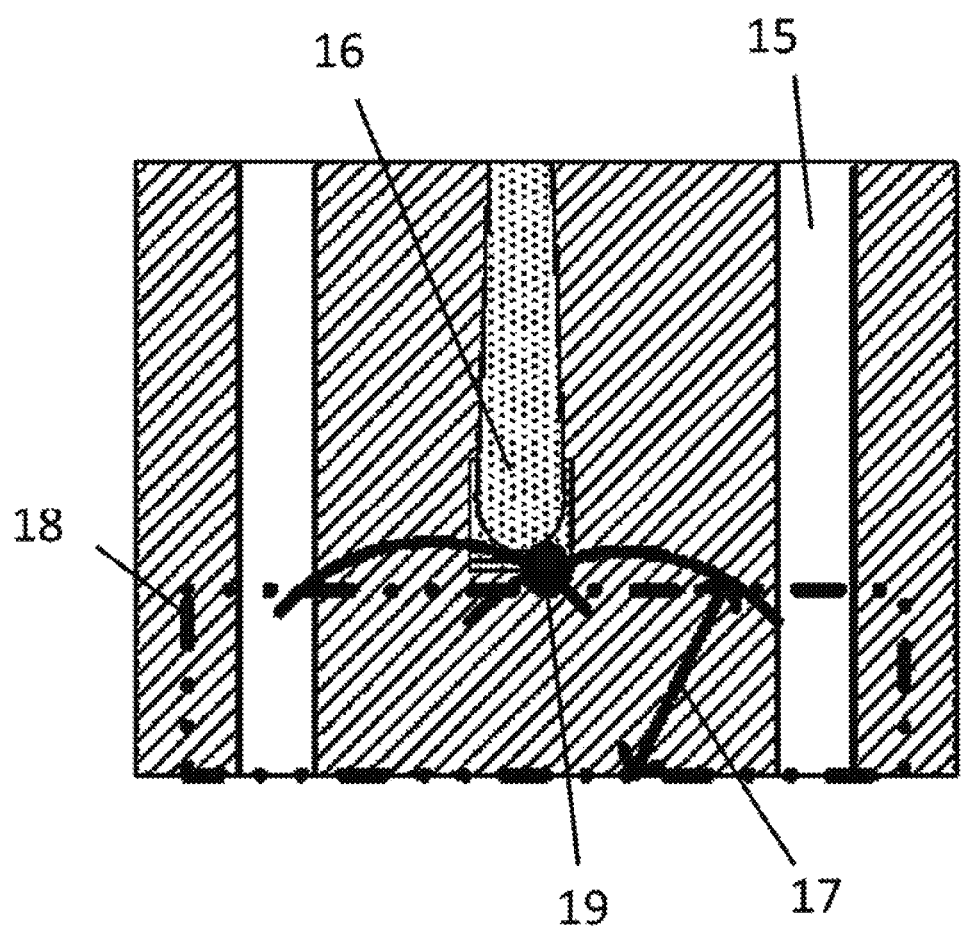
FIG. 10 illustrates a relationship between a histogram generation region and a point of intersection of two circles in a coordinate transform image in the case of two or more obstacle detection distances being obtained in the obstacle detection apparatus according to embodiment 1.

As shown in FIG. 8 and FIG. 9, in a case where the number of the corresponding obstacle detection distances 17 in the coordinate transform image is one, that is, in a case where the number of the sonar sensors 2 disposed at the front portion of the vehicle 1 is one, or in a case where an obstacle is detected by only one sonar sensor 2 even when a plurality of the sonar sensors 2 are disposed at the front portion of the vehicle 1, 0.8 times the length of the obstacle detection distance detected as described above is set to the longitudinal length of the histogram generation region. However, in a case where two or more obstacle detection distances 17 are detected, the shortest obstacle detection distance among them is adopted, and 0.8 times the length of the shortest obstacle detection distance may be set as the longitudinal length of the histogram generation region. In a case where a plurality of the obstacle detection distances 17 can be obtained, a point of intersection of the arcs at the positions of the obstacles obtained as shown in FIG. 10 is calculated, and a distance between the point of intersection and the front end of the vehicle 1 may be set as the longitudinal length of the histogram generation region.

In a case where the obstacle detection distance 17 is greater than or equal to a preset maximum value, or no obstacle is detected by the obstacle distance detection unit 101 shown in FIG. 2, for example, a histogram generation region in which the obstacle detection distance 17 has 0.8 times the preset maximum value (so-called a maximum detection distance of the sensor) in the upward direction (running direction) from the center of the lower end of the coordinate transform image in FIG. 8, is set, and an image of the histogram generation region may be outputted as the histogram generation region image. Meanwhile, in a case where the obstacle detection distance 17 is less than or equal to a preset minimum value, an obstacle is determined to be close to or in contact with the vehicle 1, and a previous histogram generation region image extracted before the obstacle detection distance 17 becomes less than the preset minimum value may be outputted as the histogram generation region image. By outputting the previous histogram generation region image as described above, even when the histogram generation region cannot be set at present due to the obstacle becoming closer, the histogram generation region image that includes no obstacle can be outputted based on the previous information.

In embodiment 1, since the sonar sensor 2 is used, an obstacle close to the sensor can be relatively easily detected. However, an obstacle in a somewhat farther region than an obstacle in the neighboring region is likely to be detected by, for example, laser or a millimeter wave. Therefore, a possibility that an obstacle may not be detected increases in the neighboring region. In this case, tracking of a position of an obstacle measured in the distant region is performed by using the motion of the vehicle, and the histogram generation region may be obtained based on the result of the tracking. Also when the histogram generation region is thus obtained based on the result of the tracking, the effect of the present disclosure is not affected.

Figure 11:
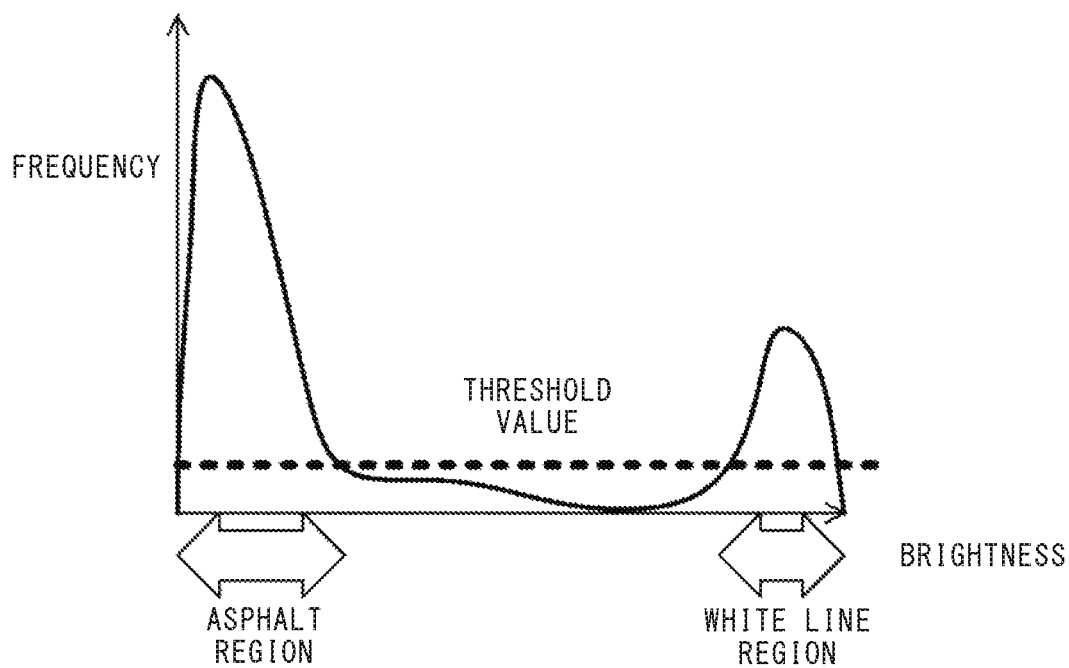
FIG. 11 illustrates a histogram in a histogram generation region image in the obstacle detection apparatus according to embodiment 1.

Next, in FIG. 3, in step S105, the histogram calculation unit 105 shown in FIG. 2 calculates a histogram. The histogram calculation unit 105 calculates the histogram from the histogram generation region image extracted by the histogram generation region image extraction unit 104. When the histogram in the histogram generation region image has been obtained, a histogram in which elements in the histogram generation region image are reflected can be obtained as shown in FIG. 11. In embodiment 1, for simplification, the histogram generation region image is described as a brightness histogram obtained as gray scale. However, the histogram generation region image is a color image in practice, and three histograms having three elements of red, green, and blue (RGB) are calculated. In a case where the color image is used, a histogram obtained by transforming color elements of the color image to elements such as hue, chroma, and/or lightness, other than the three histograms having the three elements of the RGB, may be used. Since the histogram shown in FIG. 11 is a brightness histogram obtained as gray scale, the horizontal axis represents a brightness and the vertical axis represents the frequency (for example, the number of pixels) of the brightness.

In FIG. 3, in step S106, the running-allowed region detection unit 106 shown in FIG. 2 calculates a running-allowed region. The running-allowed region detection unit 106 obtains the running-allowed region in the coordinate transform image by using a histogram back projection method based on the histogram and the coordinate transform image.

Figure 12:
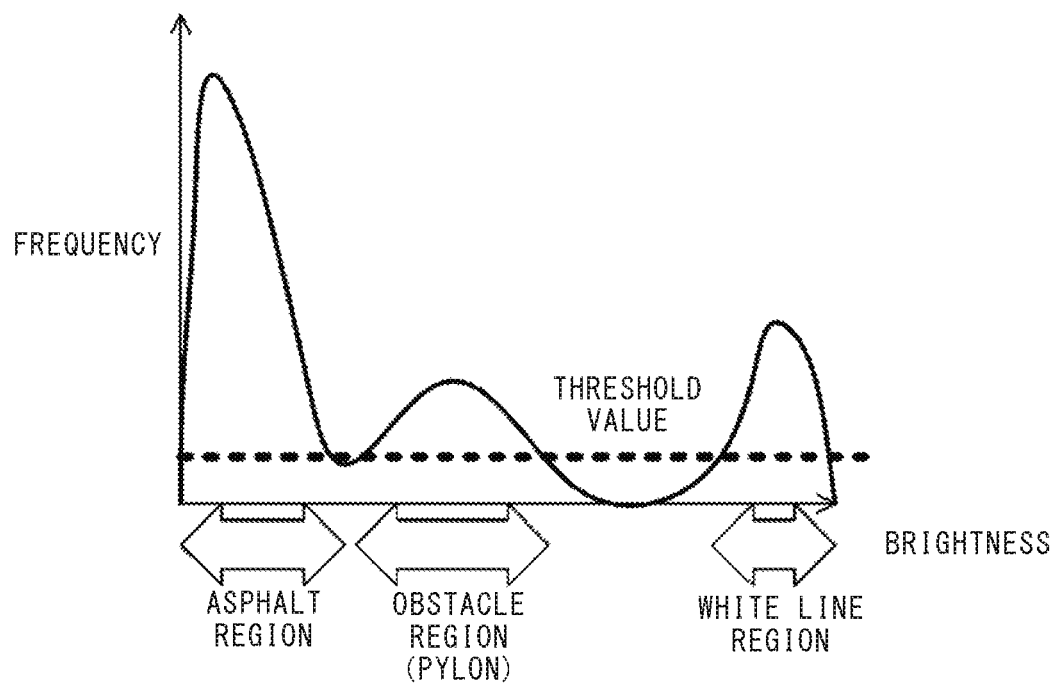
FIG. 12 illustrates a histogram of the entire region of a coordinate transform image in the obstacle detection apparatus according to embodiment 1.
Figure 13:
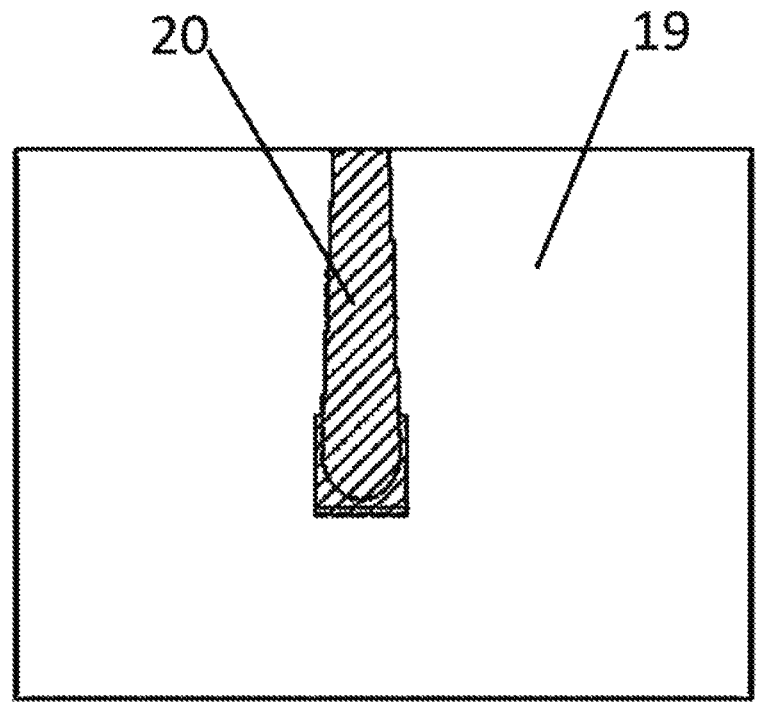
FIG. 13 illustrates an image in which a brightness value is 255 for a running-allowed road surface and the brightness value is 0 for an obstacle region, in the obstacle detection apparatus according to embodiment 1.

The histogram back projection method will be described with reference to FIG. 11 and FIG. 12, and FIG. 13. A method in which the histogram is used to reflect the frequency is referred to as the histogram back projection method. FIG. 11 illustrates the histogram in the histogram generation region image. In comparison with the histogram of the entire region of the coordinate transform image in FIG. 12, the histogram of the entire region of the coordinate transform image in FIG. 12 includes an element caused by a pylon as an obstacle on a road surface. However, since the obstacle distance detection unit 101 is set in advance so as not to obtain an image of an area including an obstacle when the histogram generation region is set, the histogram in the histogram generation region image in FIG. 11 does not include the brightness value of the obstacle. Regarding the frequencies of the brightness values of all the respective pixels in the entire region of the coordinate transform image on the histogram in the histogram generation region image in FIG. 11, the asphalt road surface and the white lines are included in the histogram and the frequencies thus indicate great values, whereas the frequency for the pylon is low and the frequency thus indicates a small value. For a value that is greater than or equal to a predetermined threshold value, the brightness value is set as 255. For a value that is less than the predetermined threshold value, the brightness value is set as 0. Thus, the process is performed for each pixel, thereby obtaining the image as shown in FIG. 13 (in FIG. 13, the brightness value is 255 for the white portion, and the brightness value is 0 for the hatched portion. The brightness value of 0 originally indicates black color. However, the hatched portion is indicated for indicating the drawing frame and reference numbers).

The running-allowed region detection unit 106 shown in FIG. 2 outputs the image shown in FIG. 13 as a running-allowed region in the coordinate transform image. In FIG. 13, the white portion represents a running-allowed road surface 19, and includes the asphalt road surface and the white lines. The hatched portion represents an obstacle region 20 and includes the pylon.

Figure 14:
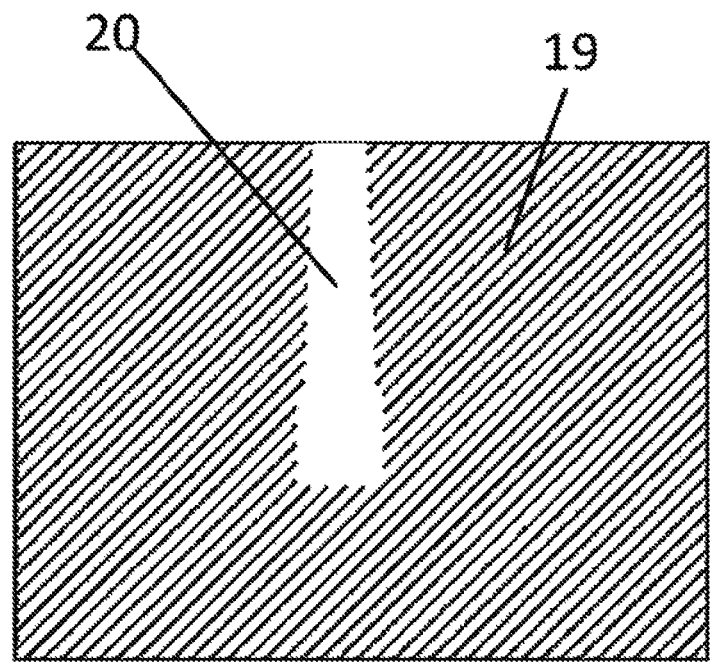
FIG. 14 illustrates an image in which a brightness value is 0 for a running-allowed road surface and the brightness value is 255 for an obstacle region, in the obstacle detection apparatus according to embodiment 1.

In FIG. 3, in step S107, the obstacle region extraction unit 107 shown in FIG. 2 inverts the brightness value of the running-allowed road surface, and outputs the image as shown in FIG. 14 in which the brightness value of 0 represents the running-allowed road surface and the brightness value of 255 represents the obstacle region. (In FIG. 14, the brightness value is 255 for the white portion, and the brightness value is 0 for the hatched portion. The brightness value of 0 originally indicates black color. However, the hatched portion is indicated for indicating the drawing frame and reference numbers, as in FIG. 13.)

Next, in FIG. 3, the obstacle detection zone in step S108 will be described.

Figure 15:
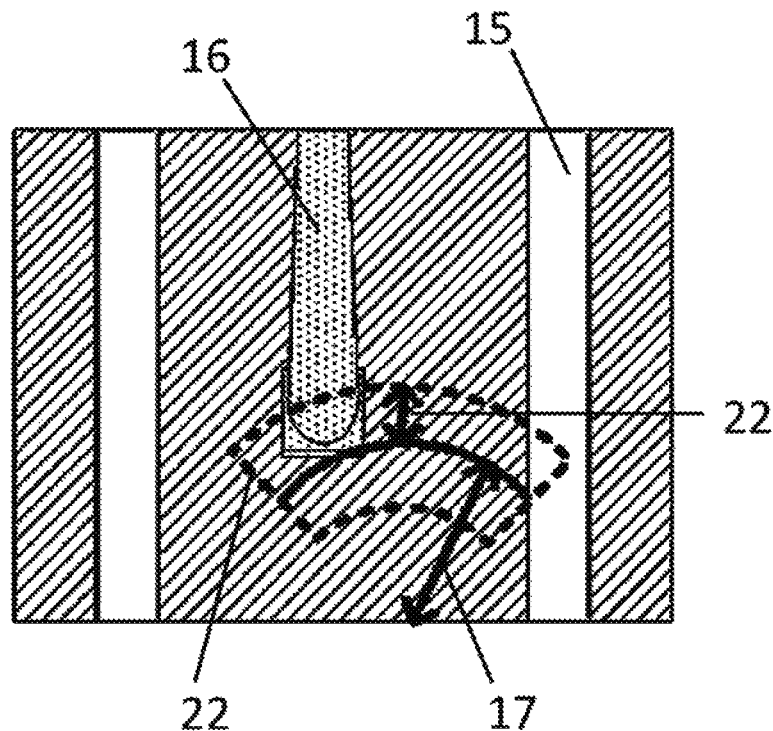
FIG. 15 illustrates a relationship between an obstacle detection zone and an obstacle detection distance in a coordinate transform image in the obstacle detection apparatus according to embodiment 1.
Figure 16:
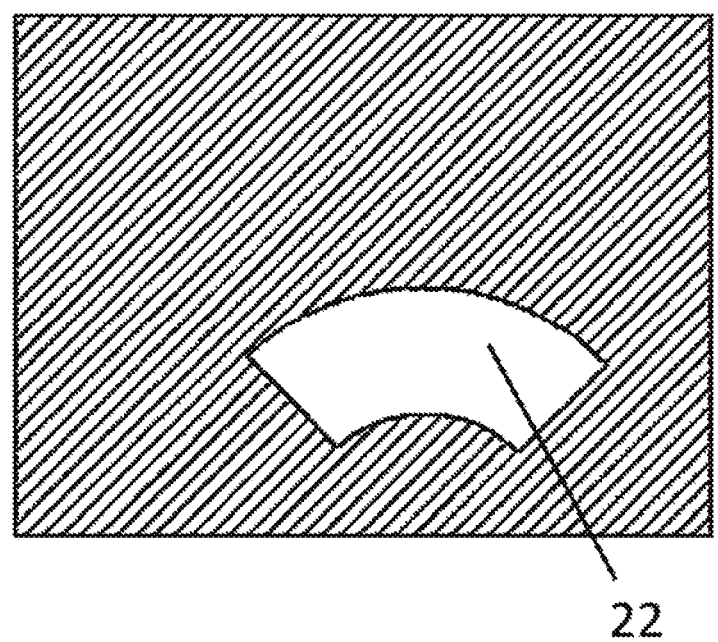
FIG. 16 illustrates an image in which a brightness value is 255 for an obstacle detection zone and the brightness value is 0 for portions other than the obstacle detection zone in the obstacle detection apparatus according to embodiment 1.

The obstacle detection zone calculation unit 109 calculates the obstacle detection zone from the obstacle detection distance 17 calculated by the obstacle distance detection unit 101, and outputs the obstacle detection zone. As described in FIG. 8 and FIG. 9, the obstacle detected by the sonar sensor 2 is at a position on an arc distant from the position of the sonar sensor 2 over the obstacle detection distance 17. As shown in FIG. 15, an obstacle detection zone 22 is obtained such that the arc at the obstacle detection distance 17 is used to set a predetermined obstacle detection width 21 in the front-rear direction (the up-down direction in FIG. 15) of the arc, and an area obtained by adding and subtracting the obstacle detection width to and from the arc is set as the obstacle detection zone 22. The obstacle detection width 21 represents a value obtained in consideration of an obstacle detection error of the sonar sensor 2, and the like. In embodiment 1, for example, an area of about ±30 cm is ensured. The obstacle detection zone 22 is represented as shown in FIG. 16, and the brightness value of 255 is outputted for all the regions of the obstacle detection zone, and the brightness value of 0 is outputted for the other regions. (In FIG. 16, the brightness value is 255 for the white portion, and the brightness value is 0 for the hatched portion. The brightness value of 0 originally indicates black color. However, the hatched portion is indicated for indicating the drawing frame and reference numbers, as in FIG. 13 and FIG. 14.)

Next, a differential image obstacle region will be described.

In FIG. 3, in step S109, the vehicle state detection unit 110 shown in FIG. 2 obtains a running-vehicle speed of the vehicle 1 by using the other sensors 11.

In FIG. 3, in step S110, the image storage unit 111 shown in FIG. 2 stores previous images. The image storage unit 111 has a memory (not shown) capable of storing a plurality of frames of inputted images, and can output any video image stored in the memory. In embodiment 1, the coordinate transform image outputted by the first image transform unit 103 is stored each time the transformation is performed, and outputs the previous coordinate transform image that has been stored a designated time before. The number of images that can be stored in the image storage unit 111 is limited, and the earliest coordinate transform image is deleted and the coordinate transform image having been inputted anew is stored when the number of stored images reaches the number of images that can be stored. The designated time for the previous coordinate transform images to be outputted may be, for example, 200 ms. However, the designated time may not be fixed. The designated time may be changed according to the vehicle speed of the vehicle 1. For example, when the vehicle speed is low, the designated time may be increased, and, when the vehicle speed is high, the designated time may be reduced.

Figure 17:
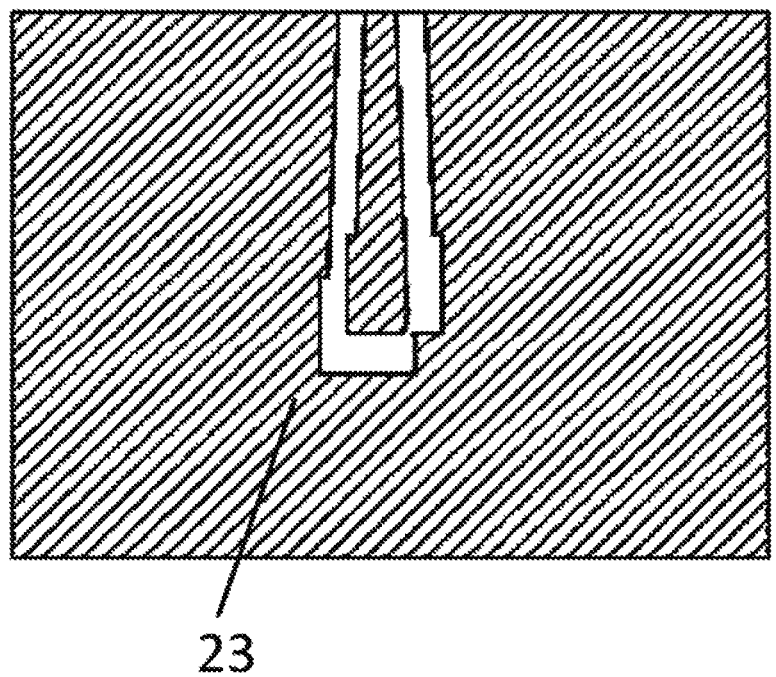
FIG. 17 illustrates an image in which a brightness value is 255 for a differential image obstacle region and the brightness value is 0 for portions other than the differential image obstacle region in a road surface detection device according to embodiment 1.

In FIG. 3, in step S111, the differential image obstacle region extraction unit 112 shown in FIG. 2 obtains a differential image obstacle region, based on the inputted coordinate transform image and the previous coordinate transform image outputted by the image storage unit 111, and outputs the differential image obstacle region. The deviation between the coordinate transform image and the previous coordinate transform image is generally referred to as a time difference or a difference between frames, and a place at which change occurs in the image can be extracted. In a case where the vehicle 1 is moving, the position of the obstacle changes on the coordinate transform image. Therefore, as shown in FIG. 17, a differential image obstacle region 23 is detected, and the brightness value of 255 is outputted for the entirety of the differential image obstacle region 23 and the brightness value of 0 is outputted for the other regions. (In FIG. 17, the brightness value is 255 for the white portion, and the brightness value is 0 for the hatched portion. The brightness value of 0 originally indicates black color. However, the hatched portion is indicated for indicating the drawing frame and reference numbers, as in FIG. 13, FIG. 14, and FIG. 16.) However, in a case where the vehicle 1 is not moving and the obstacle itself is not moving, the differential image obstacle region is not detected. Therefore, in embodiment 1, the moving-vehicle speed is used to detect the movement of the vehicle 1, and, in a case where the vehicle 1 is at stop, a flag indicating that the differential image obstacle region cannot be detected is outputted, or a brightness value of 255 is outputted for the entire region of the coordinate transform image.

Figure 18:
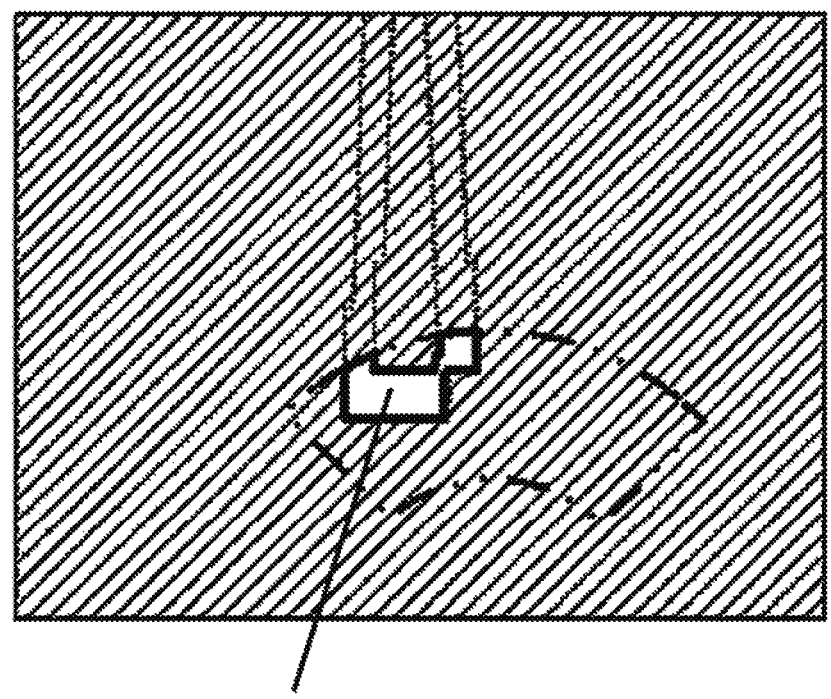
FIG. 18 illustrates an image in which a brightness value is 255 for a portion in which an obstacle region, an obstacle detection zone, and a differential image obstacle region overlap each other, in the obstacle detection apparatus according to embodiment 1.

In FIG. 3, in step S112, the obstacle position detection unit 108 shown in FIG. 2 finally detects a region in which the obstacle region 20 in FIG. 14, the obstacle detection zone 22 in FIG. 16, and the differential image obstacle region 23 in FIG. 17 overlap each other, as an obstacle region 24 in the coordinate transform image, as shown in FIG. 18. The obstacle position detection unit 108 further obtains position information of the obstacle region 24 in the coordinate transform image. As the position information of the obstacle region 24 in the coordinate transform image, a position of the obstacle region 24 in the coordinate transform image is converted to a position based on the vehicle 1. This conversion can be geometrically performed based on the position CP' of the camera 3a described in FIG. 4, an angle of view and a focal length of the camera 3a, and the size of the coordinate transform image. Furthermore, as the position information of the obstacle region 24 in the coordinate transform image, a value at a position (a position, in the differential image obstacle region 23, at which the straight line connecting between the camera 3 and the differential image obstacle region 23 has the shortest distance) closest to the vehicle 1 in the differential image obstacle region 23 is used. This is because, as described for the first image transform unit 103 in FIG. 6 and FIG. 7, since information on the height direction of the obstacle is not obtained, even the actual relationship shown in FIG. 6 is transformed to the image shown in FIG. 7. Taking into consideration that no influence thereof is exerted, the position close to the camera 3 in the vehicle 1 represents a correct position.

Thus, the obstacle detection apparatus of embodiment 1 obtains a road surface image of a portion around the vehicle by using the camera, further transforms the road surface image to the coordinate transform image, measures an obstacle distance between the vehicle and the obstacle around the vehicle by using a sonar, extracts the histogram generation region image in a region which does not include an obstacle in the coordinate transform image, based on the obstacle distance, obtains the running-allowed region and the obstacle region based on the histogram in the histogram generation region image and the coordinate transform image, extracts overlapping of the obstacle region, the obstacle detection zone obtained from the obstacle distance, and the differential image obstacle region obtained by difference in the coordinate transform image, obtains the obstacle region in the coordinate transform image, and further obtains the position of the obstacle, to detect an obstacle with a higher accuracy than conventional art.

Embodiment 2

An automatic braking apparatus of embodiment 2 prevents contact of the vehicle 1 with an obstacle by using the position of the obstacle obtained by the obstacle detection apparatus of embodiment 1.

Figure 19:
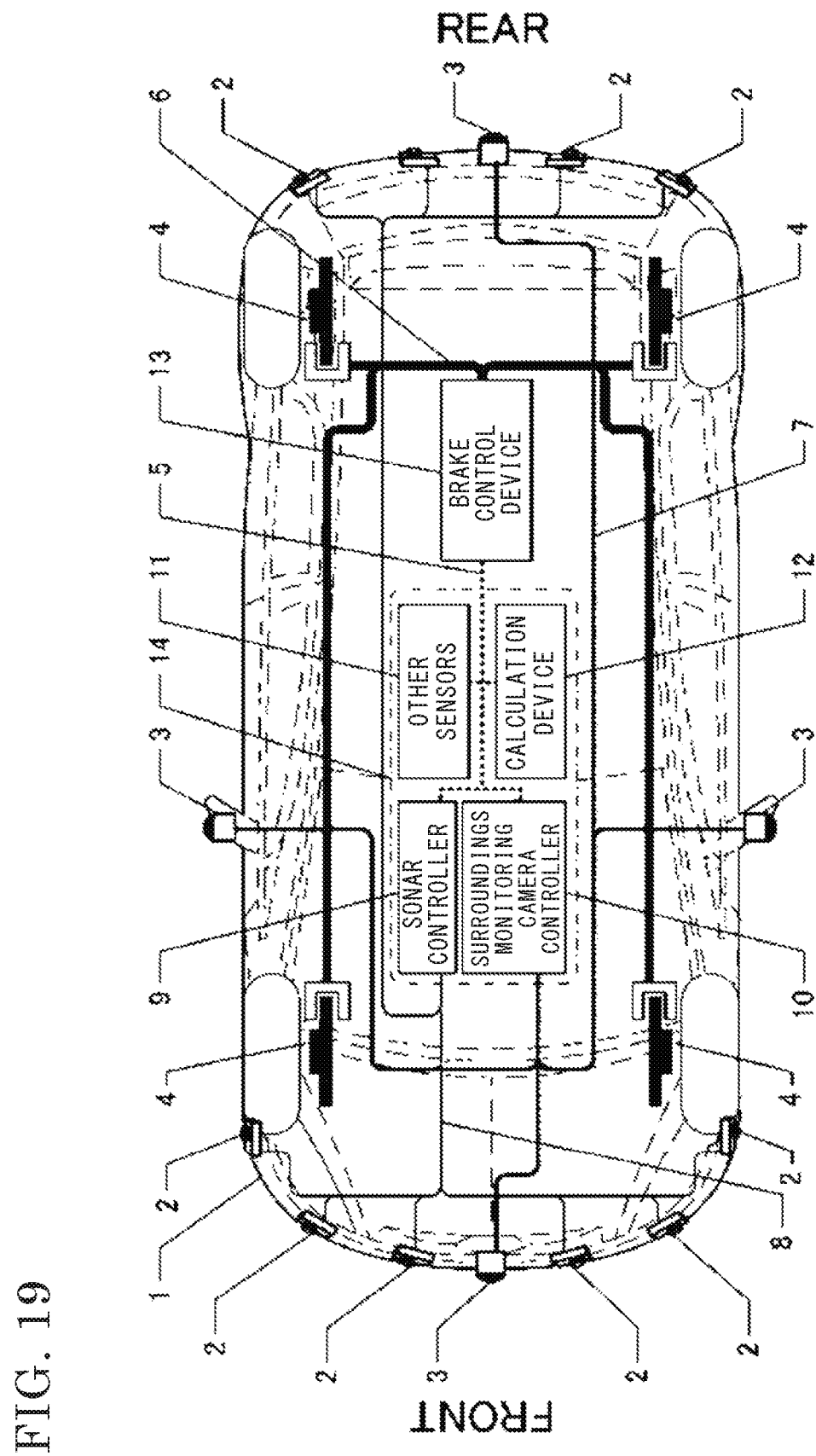
FIG. 19 is a schematic diagram illustrating a configuration of an automatic braking apparatus according to embodiment 2.

The configuration of the automatic braking apparatus of embodiment 2 will be described with reference to FIG. 19. In FIG. 19, the components common to those of the obstacle detection apparatus of embodiment 1 are denoted by the same reference characters.

The automatic braking apparatus of embodiment 2 includes a brake control device 13, hydraulic piping 6, and a brake 4 in addition to the components of the obstacle detection apparatus of embodiment 1. The brake 4 and the brake control device 13 are connected to each other by the hydraulic piping 6, and the brake control device 13 is connected to the calculation device 12 of the road surface detection device 14 by the communication line 5. A target deceleration calculated by the calculation device 12 is transmitted to the brake control device 13 by the communication line 5, and the vehicle 1 can be braked by the brake 4 according to an instruction from the brake control device 13. The automatic braking apparatus may not necessarily be limited to such a structure. For example, in an EV vehicle that is caused to run by a motor, or an HEV•PHEV vehicle that is caused to run by an engine and a motor, deceleration regeneration of the motor may be used for braking.

Figure 20:
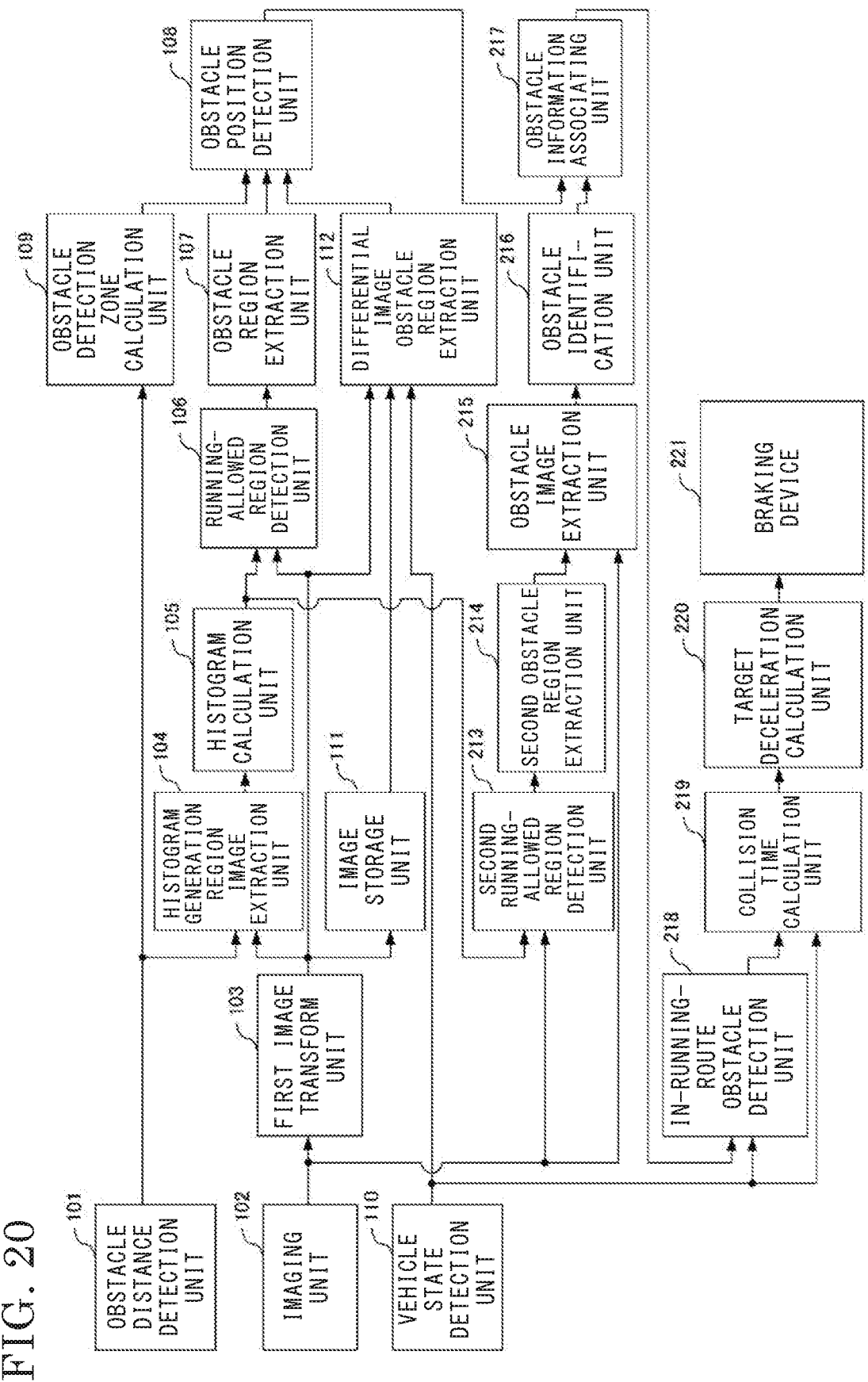
FIG. 20 is a functional block diagram illustrating the automatic braking apparatus according to embodiment 2.
Figure 21:
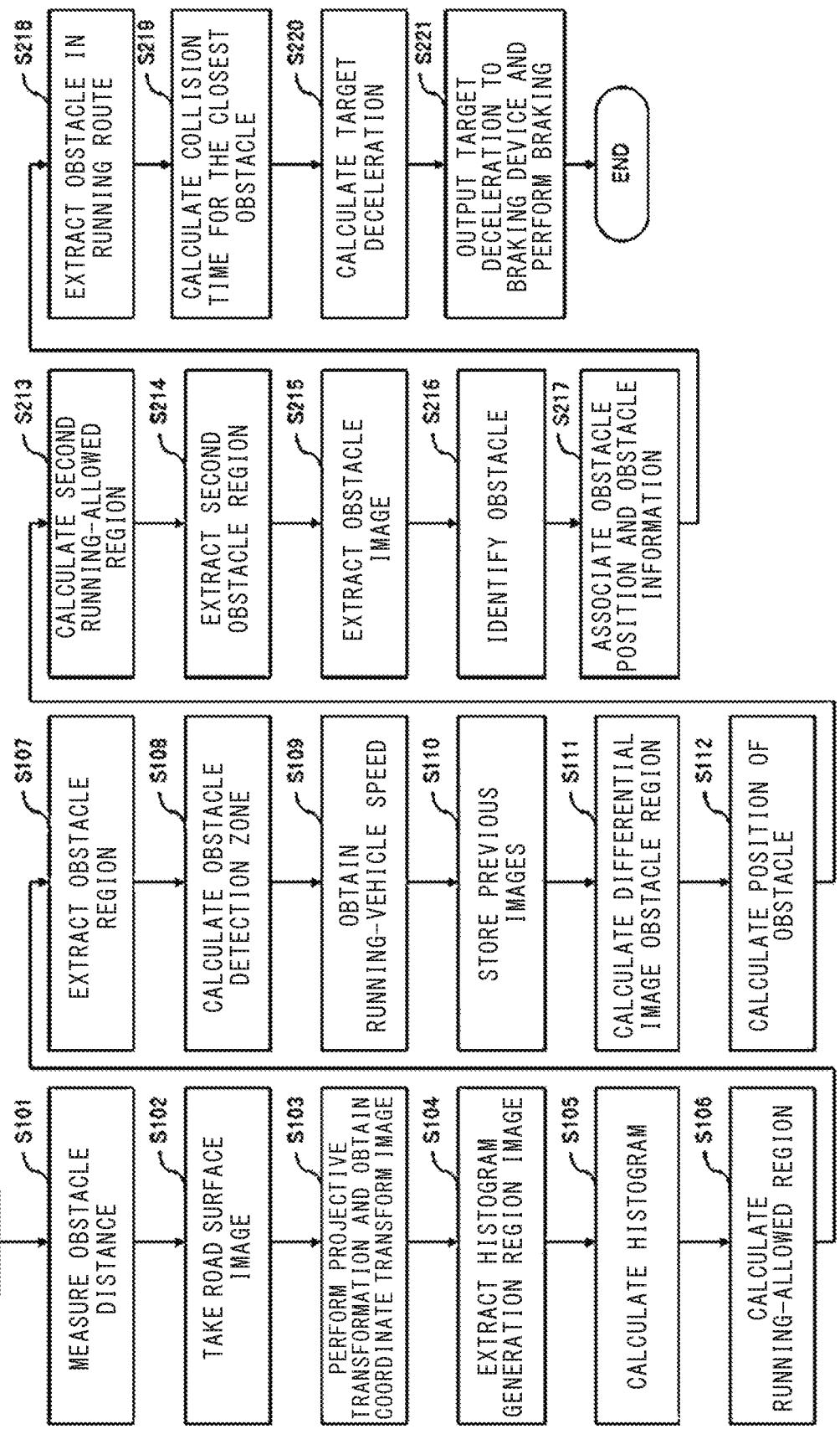
FIG. 21 is a flow chart showing an operation of the automatic braking apparatus according to embodiment 2.

Next, the function and operation of the automatic braking apparatus of embodiment 2 will be described with reference to a functional block diagram shown in FIG. 20 and a flow chart shown in FIG. 21. In FIG. 20 and FIG. 21, the same components as those of the obstacle detection apparatus of embodiment 1 are denoted by the same reference characters as in the functional block diagram in FIG. 2 and the flow chart in FIG. 3, and the description thereof is omitted.

The automatic braking apparatus of embodiment 2 additionally includes a second running-allowed region detection unit 213, a second obstacle region extraction unit 214, an obstacle image extraction unit 215, an obstacle identification unit 216, an obstacle information associating unit 217, an in-running-route obstacle detection unit 218, a collision time calculation unit 219, a target deceleration calculation unit 220, and a braking device 221, in the obstacle detection apparatus of embodiment 1. These functions are repeatedly operated periodically according to the flow chart shown in FIG. 21. An operation of general automatic braking apparatuses is described for the in-running-route obstacle detection unit 218 to the braking device 221 in FIG. 20 and for step S218 to step S221 in FIG. 21, and the function and the operation thereof are not necessarily limited to the described ones.

The operations of step S101 to step S112 in the flow chart shown in FIG. 21 are the same as described for embodiment 1, and the description thereof is omitted.

Figure 22:
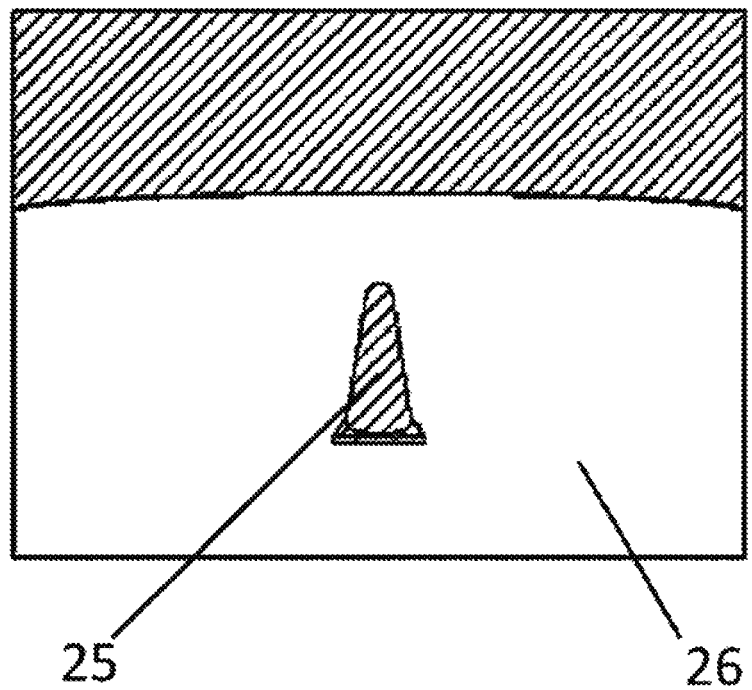
FIG. 22 illustrates an image in which a brightness value is 255 for a second running-allowed road surface and the brightness value is 0 for a second obstacle region in the automatic braking apparatus according to embodiment 2.

In FIG. 21, in step S213, the second running-allowed region detection unit 213 shown in FIG. 20 calculates a second running-allowed region based on a road surface image and a histogram. This calculation and the calculation performed in step S106 by the running-allowed region detection unit 106 use the same histogram back projection method. However, the calculations are different in that a coordinate transform image is used in step S106 and a road surface image is used in step S213. Thus, a running-allowed region in the road surface image as shown in FIG. 22 is obtained as the second running-allowed region in step S213. (In FIG. 22, the brightness value is 255 for the white portion, and the brightness value is 0 for the hatched portion. The brightness value of 0 originally indicates black color. However, the hatched portion is indicated for indicating the drawing frame and reference numbers.) In FIG. 22, a second running-allowed region 26 includes an asphalt road surface and a white line, and a second obstacle region 25 includes a pylon.

Figure 23:
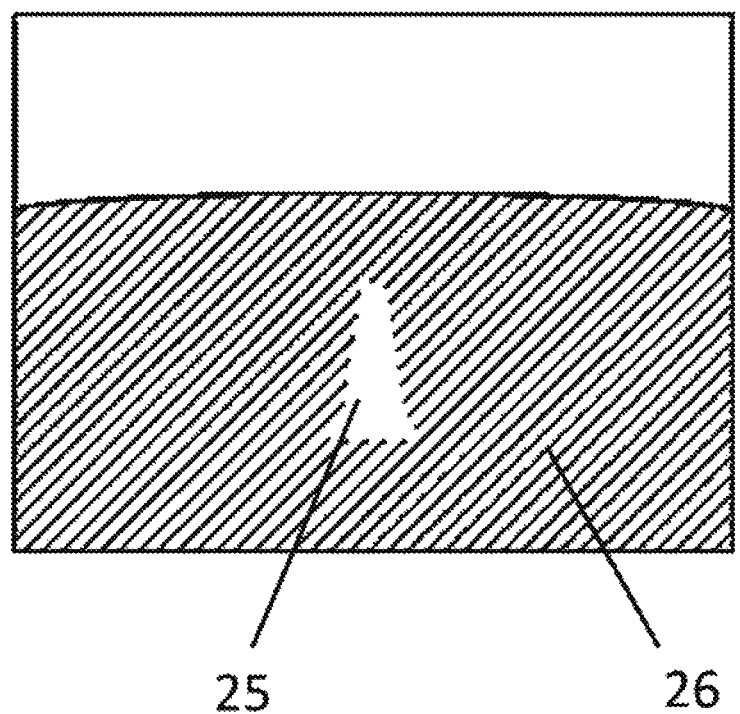
FIG. 23 illustrates an image in which a brightness value is 255 for a second obstacle region and the brightness value is 0 for a second running-allowed region in the automatic braking apparatus according to embodiment 2.

In FIG. 21, in step S214, the second obstacle region extraction unit 214 shown in FIG. 20 inverts the brightness value of the second running-allowed region 26, and outputs 0 as a brightness value for the second running-allowed region 26 and outputs 255 as a brightness value for the second obstacle region 25 as shown in FIG. 23. (In FIG. 23, the brightness value is 255 for the white portion, and the brightness value is 0 for the hatched portion. The brightness value of 0 originally indicates black color. However, the hatched portion is indicated for indicating the drawing frame and reference numbers as in FIG. 22.)

Figure 24:
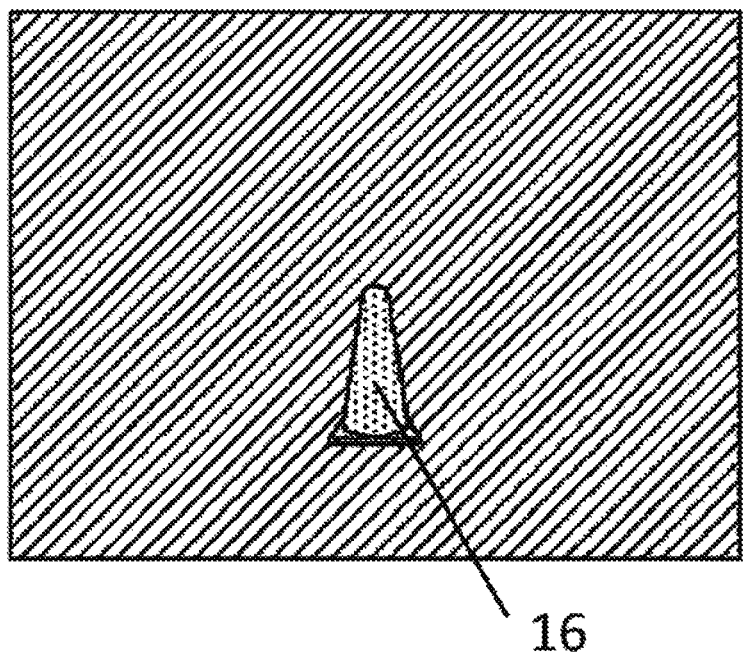
FIG. 24 illustrates an obstacle image in the automatic braking apparatus according to embodiment 2.

In FIG. 21, in step S215, the obstacle image extraction unit 215 shown in FIG. 20 calculates an obstacle image by extracting only an obstacle on a hatched background as shown in FIG. 24, based on the road surface image and the second obstacle region 25, and outputs the obstacle image. The obstacle image can be obtained by multiplying the road surface image by the second obstacle region 25 in units of pixels. The image of the second obstacle region 25 serves as a so-called mask image, and transmission through only a region in which the brightness value is 255 can be performed in the second obstacle region. In FIG. 24, only the pylon 16 is extracted as an obstacle because only one obstacle is in the road surface image. In a case where the number of obstacles is plural, a plurality of obstacles appear in the obstacle image in FIG. 24. In a case where the image in FIG. 23 is masked, a portion above the horizontal line is also extracted. However, this causes an erroneous detection, and the portion is deleted so as not to be extracted. A position of the horizontal line can be determined based on the position CP of the camera 3.

In FIG. 21, in step S216, the obstacle identification unit 216 shown in FIG. 20 identifies an obstacle in the image, for each element in the obstacle image in FIG. 24, to perform recognition. The obstacle identification method is not the feature of the present disclosure, and may be any method. For example, a pattern recognition in which a plurality of obstacle images are stored in advance, and similarity is calculated, may be used. Alternatively, as is performed in recent years, a plurality of obstacle images are used to perform learning by the neural network in advance, and the obstacle may be identified from the kind, structure, outer appearance, and function of the image in the obstacle image based on the results of the learning. In embodiment 2, an obstacle image extracted from the road surface image as shown in FIG. 24 is used to enhance the accuracy of the obstacle identification unit 216. This is because not an image of the pylon 16 in the coordinate transform image as shown in FIG. 7 but an image of the pylon 16 which is taken at the position CP of the camera 3 as shown in FIG. 5 is used as a plurality of obstacle images which are prepared in advance and used in the above-described pattern recognition, or as a plurality of obstacle images used for learning by the neural network. Thus, a degree of identification of an obstacle is enhanced. This is one of the features of the automatic braking apparatus of embodiment 2.

In FIG. 21, in step S217, the obstacle information associating unit 217 shown in FIG. 20 associates position information of the obstacle region calculated in step S112 by the obstacle position detection unit 108, with a result for an obstacle identified in step S216 by the obstacle identification unit 216, and outputs the obtained result as new obstacle information.

In FIG. 21, the operations of step S218 to step S221 are mainly related to braking performed by the automatic braking apparatus. In step S218, the in-running-route obstacle detection unit 218 shown in FIG. 20 extracts an obstacle in a running route of the vehicle 1, from the obstacle information. The running route of the vehicle 1 is calculated by using an angle of a steering wheel, a vehicle speed, and a shift state obtained by the vehicle state detection unit 110, and the size information (the vehicle width, the entire length, a wheelbase, a rack-and-pinion gear ratio in steering, and the like) of the vehicle 1 which is stored in the in-running-route obstacle detection unit 218 in advance. In embodiment 2, a boundary between a region in which the vehicle 1 passes and a region in which the vehicle 1 does not pass in a case where the vehicle runs so as to maintain the current angle of the steering wheel and vehicle speed, is set as the running route of the vehicle.

Figure 25:
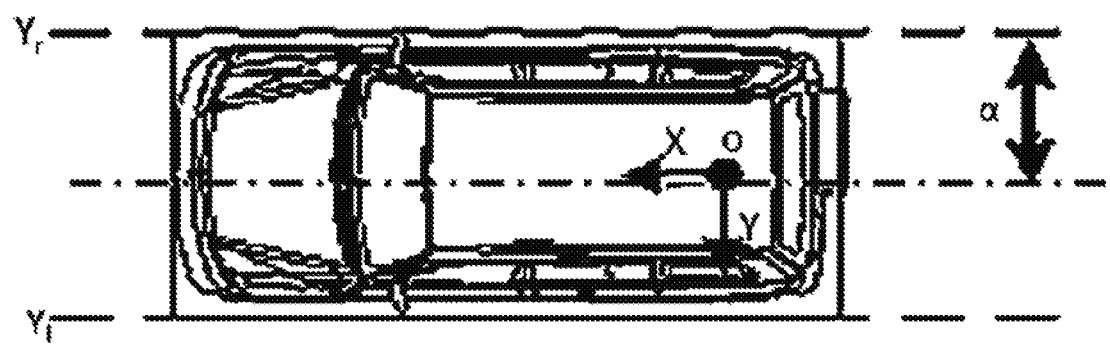
FIG. 25 illustrates a running route in straight running in the automatic braking apparatus according to embodiment 2.

In the straight running (specifically, when the angle of the steering wheel is in a range of about ±10 degrees), the vehicle runs almost straight relative to the running direction. At this time, whether the vehicle runs forward or backward depends on a shift state. In a case where the shift state represents a D range, the vehicle runs forward. In a case where the shift state represents an R range, the vehicle runs backward. In this case, as shown in FIG. 25, the vehicle runs straight, and, therefore, the boundary between a region in which the vehicle 1 passes and a region in which the vehicle 1 does not pass is the right and the left positions of the vehicle as they are. As shown in FIG. 25, in a case where $Y_r$ represents a right-side boundary of the vehicle 1, $Y_l$ represents a left-side boundary of the vehicle 1, and α represents half the lateral width of the vehicle 1, the boundary can be represented by equation (1) based on the rear wheel axle center that serves as the coordinate originating point.

[Mathematical 1]

$$\begin{cases} Y_r = -\alpha \\ Y_l = +\alpha \end{cases} \quad (1)$$

Figure 26:
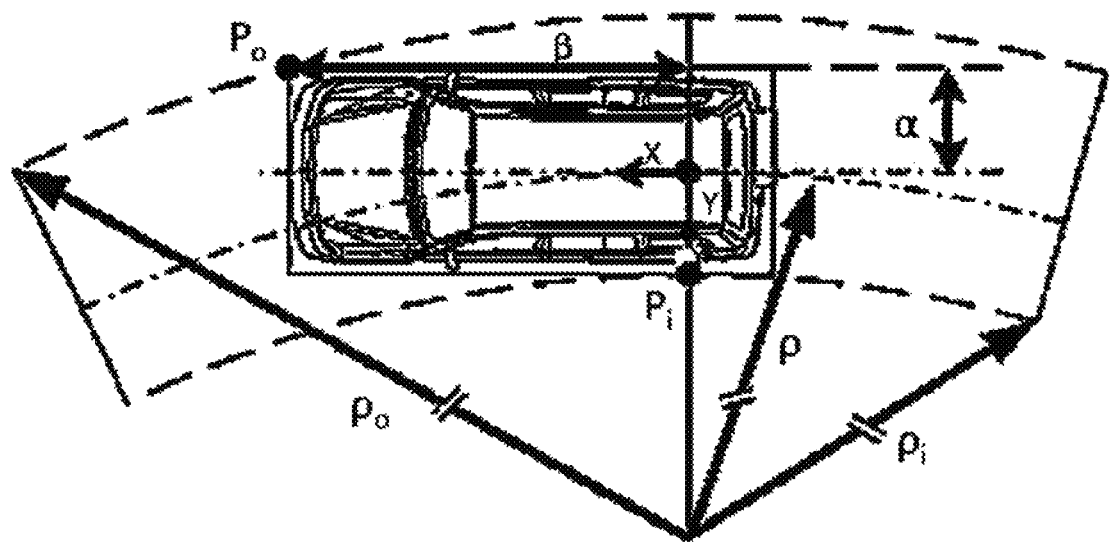
FIG. 26 illustrates a running route in turning in the automatic braking apparatus according to embodiment 2.

In the turning state (specifically, state other than the above-described straight running state), the boundary between a region in which the vehicle 1 passes and a region in which the vehicle 1 does not pass is represented by the relationship shown in FIG. 26. FIG. 26 shows the relationship in the case of the vehicle turning leftward. In the leftward turning, a portion at which the vehicle 1 runs on the innermost side is a point Pi shown in FIG. 26. A route in which the point Pi continuously passes is the left-side boundary of the vehicle 1. A portion at which the vehicle 1 runs on the outermost side is a point Po shown in FIG. 26. A route in which the point Po continuously passes is the right-side boundary of the vehicle 1. In FIG. 26, the vehicle turns with respect to the point C. In this case, the turning radius ρ is represented by the following equation (2).

[Mathematical2]

$$\rho = l/\delta \quad (2)$$

In equation (2), ρ represents a turning radius, l represents a wheelbase of the vehicle 1, and δ represents a tire angle of the front wheel. Furthermore, the tire angle δ and the steering wheel angle θ are reduced by the rack-and-pinion gear ratio Grp in the steering as represented by equation (3).

[Mathematical3]

$$\delta = \theta / G_{rp} \quad (3)$$

Equation (2) is derived according to the following Document 1. Particularly in the present embodiment, since the operation range in the emergency brake control is limited to an operation at a low vehicle speed, a relational expression of a steering wheel angle and the turning radius p in the case of steady circular turning in which a centrifugal force and sideslip do not occur in a vehicle is used for equation (2).

Document 1: Kabushiki Kaisha Sankaido: Abe Masato cho, "Jidousha no Undou to Seigyo", Dai 3 sho: Sharyou Undou no Kiso, 3.3 setsu: Sharyou no Teijou Ensenkai (SANKAIDO PUBLISHING Co., Ltd.: written by Masato Abe, "Movement and Control of Automobile", Chapter 3: Basics of Vehicle Movement, Section 3.3: Steady Circular Turning of Vehicle)

An inner turning radius pi representing a radius of the left-side boundary of the vehicle 1 and an outer turning radius ρo representing a radius of the right-side boundary of the vehicle 1, with respect to the turning radius ρ, are represented by equation (4) and equation (5) in which α and β in FIG. 26 are used. α in FIG. 26 represents half the length of the lateral width of the vehicle 1, and β represents a value obtained by adding the wheelbase 1 and a front overhang of the vehicle 1 to each other.

[Mathematical4]

$$\rho_i = \rho - \alpha \quad (4)$$

[Mathematical5]

$$\rho_o = \sqrt{(\rho+\alpha)^2 + \beta^2} \quad (5)$$

An equation representing the left-side boundary of the vehicle 1 and an equation representing the right-side boundary thereof are obtained as equation (6) and equation (7), respectively, based on the turning radius ρ, the inner turning radius ρi, and the outer turning radius ρo.

[Mathematical6]

$$Y_l = \rho - \sqrt{\rho_i^2 - X_l^2} \quad (6)$$

[Mathematical7]

$$Y_r = \rho - \sqrt{\rho_o^2 - X_r^2} \quad (7)$$

Equation (6) and equation (7) are equations representing the left-side boundary and the right-side boundary of the vehicle 1 in the case of leftward turning of the vehicle 1. In the case of rightward turning of the vehicle 1, the left-side boundary of the vehicle 1 is represented by equation (8) and the right-side boundary thereof is represented by equation (9).

[Mathematical8]

$$Y_l = -\rho + \sqrt{\rho_i^2 - X_l^2} \quad (8)$$

[Mathematical9]

$$Y_r = -\rho + \sqrt{\rho_o^2 - X_r^2} \quad (9)$$

In FIG. 21, in step S218, equation (1) to equation (9) are obtained to calculate the running route of the vehicle.

Figure 27:
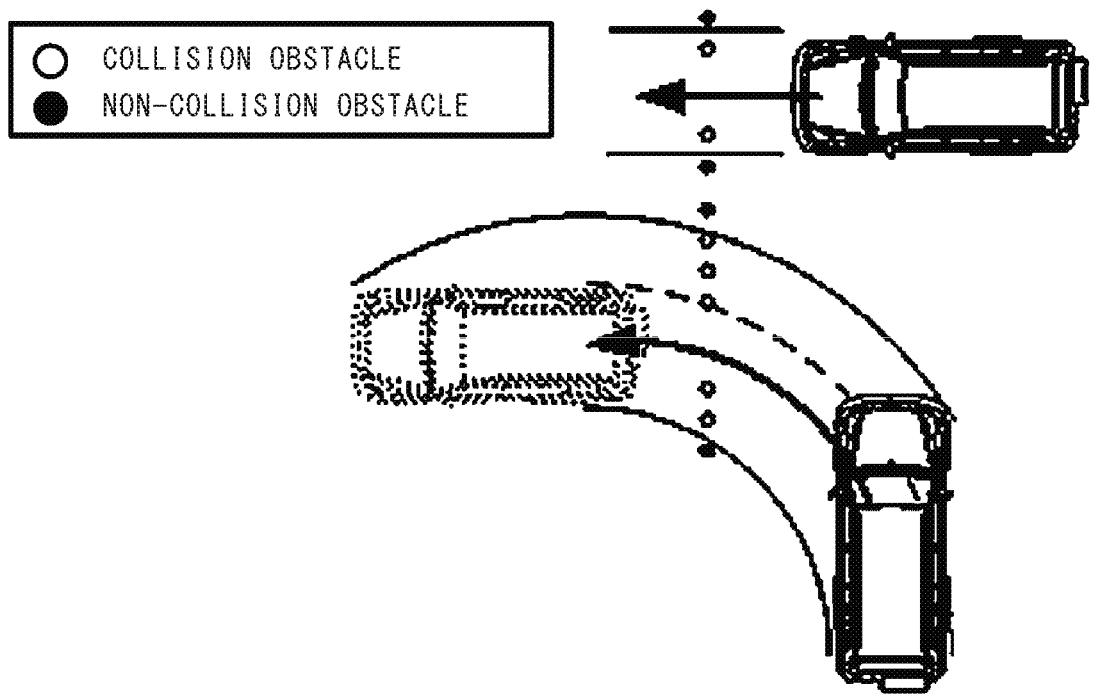
FIG. 27 illustrates a running route and a collision obstacle in the automatic braking apparatus according to embodiment 2.

In step S218, information of an obstacle, among obstacles, which contacts with the vehicle is merely extracted by using the obstacle position information and the running route obtained by equation (1) to equation (9). A specific method for determining whether or not an obstacle is on the route of the vehicle is schematically shown in FIG. 27. That is, whether the vehicle 1 runs straight, turns leftward, or turns rightward, is determined. Whether or not the obstacle position information indicates that the obstacle is in the range satisfying equation (1) is determined in the case of the straight running. Whether or not the obstacle position information indicates that the obstacle is in the range satisfying both equation (6) and equation (7) is determined in the case of leftward turning. Whether or not the obstacle information indicates that the obstacle is in the range satisfying both equation (8) and equation (9) is determined in the case of rightward turning. Thus, whether or not the position of the obstacle is in the running route is determined and information of an obstacle in the running route is merely extracted.

In FIG. 21, in step S219, the collision time calculation unit 219 shown in FIG. 20 calculates a collision time that is an estimated time up to contact with each obstacle, for the position information of a plurality of obstacles determined as collision obstacles, in a case where the vehicle 1 runs at a current vehicle speed. As a simple method for calculating the collision time, a distance of a straight line connecting between the obstacle and the vehicle 1 may be merely divided by a vehicle speed. As a complicated method with a higher accuracy, a position at which the obstacle contacts with the vehicle 1 is calculated, and an actual distance from the position of the obstacle to the position at which the obstacle contacts with the vehicle, for example, a distance of the straight line in the straight running or a distance of an arc based on turning in the case of the turning, may be obtained and divided by a vehicle speed. The effect of the present disclosure is not affected by each of the simple method and the complicated method.

Finally, in step S219, the value of the shortest time among the individually calculated collision times, that is, a collision time of an obstacle that is most likely to contact with the vehicle 1 earliest, with respect to position information of the plurality of obstacles determined as collision obstacles, is outputted as the shortest collision time. In a case where the vehicle 1 is at stop, the vehicle speed used for calculating the collision time is 0. Therefore, when the vehicle speed is used as it is for the division, the calculation device 12 indicates an error. However, an obstacle does not collide with a vehicle when the vehicle is at stop. Therefore, only in this case, collision times for position information of all the obstacle are set as the maximum value set for the collision time, and the shortest collision time is also set as the maximum value set for the collision time. The maximum value for the collision time may be set as such a great value as to set the target deceleration to 0 in the following step S220.

In FIG. 21, in step S220, the target deceleration calculation unit 220 shown in FIG. 20 calculates a target deceleration based on the shortest collision time. Various methods for calculating the target deceleration are considered. For example, as indicated in the table in FIG. 28, three target decelerations are selected according to the value of the shortest collision time in general. In embodiment 2, an obstacle can be identified, and target decelerations are set as in the table indicated in FIG. 29, according to the kinds of obstacles, so as to correspond to the shortest collision time. The target deceleration shown in FIG. 29 is changed based on the kind of an obstacle that is likely to collide. In a case where the identified obstacle corresponds to a person, a motorcycle, or the like as a kind of the obstacle, the deceleration is increased. In a case where the identified obstacle corresponds to the other obstacle (for example, a pylon on a road or a wall surface of a building), the deceleration is set to be low. This is because a deceleration is to be increased to avoid the collision more safely than in a normal case, for an obstacle that is more likely to increase damage to the other object in collision, based on other obstacles such as a pylon on a road or a wall surface of a building. This is the other feature of the automatic braking apparatus of embodiment 2.

Finally, in FIG. 21, in step S221, the braking device 221 controls a hydraulic pressure such that an actual deceleration of the vehicle 1 follows the target deceleration calculated by the target deceleration calculation unit 220 and operates the brake 4, thereby decelerating the vehicle 1.

Thus, the automatic braking apparatus of embodiment 2 includes: the second running-allowed region detection unit for extracting a second running-allowed region in which the vehicle can run, in a road surface image, based on the road surface image and the histogram; the second obstacle region extraction unit for extracting a second obstacle region in the road surface image, based on the second running-allowed region; the obstacle image extraction unit for extracting an obstacle image in the road surface image based on the second obstacle region and the road surface image; the obstacle identification unit for identifying an object in the obstacle image, based on the obstacle image, to recognize an obstacle, and outputting an identification result as obstacle identification information; and an obstacle information associating unit for associating the obstacle position information and the obstacle identification information with each other, in the road surface detection device of embodiment 1. The automatic braking apparatus changes a target deceleration in automatic braking based on the obstacle position information and the obstacle identification information associated by the obstacle information associating unit. Thus, a deceleration is changed, with a high obstacle identification accuracy, based on the identification result of the obstacle, thereby performing deceleration based on a degree of damage to an obstacle due to the collision.

In embodiment 2, the vehicle 1 is braked in order to avoid an obstacle. However, warning may be made to a driver immediately before the braking, by using a speaker or the like (not shown) that is separately provided. Also in such a configuration, the effect of the present disclosure is not degraded. In embodiment 2, the automatic braking apparatus brakes the vehicle for an obstacle around the vehicle. However, the automatic braking apparatus may be applied to, for example, a blind spot working device when used for monitoring a rear lateral side of the vehicle 1. Also in this case, as in embodiment 2, a moving object that is approaching from the rear lateral side can be identified, for example, whether the object is a vehicle, a motorcycle, a pedestrian, or the like can be determined, by using obstacle images in the road surface images by the left and right cameras 3. Thus, based on the approaching moving object, the warning time and the display method can be changed.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 vehicle
2 sonar sensor
3 camera
4 brake
5 communication line
6 hydraulic piping
7 camera wiring
8 sonar sensor wiring
9 sonar controller
10 surroundings monitoring camera controller
11 other sensors
12 calculation device
13 brake control device
14 road surface detection device
101 obstacle distance detection unit
102 imaging unit
103 first image transform unit
104 histogram generation region image extraction unit
105 histogram calculation unit
106 running-allowed region detection unit
107 obstacle region extraction unit
108 obstacle position detection unit
109 obstacle detection zone calculation unit
110 vehicle state detection unit
111 image storage unit
112 differential image obstacle region extraction unit
213 second running-allowed region detection unit
214 second obstacle region extraction unit
215 obstacle image extraction unit
216 obstacle identification unit
217 obstacle information associating unit
218 in-running-route obstacle detection unit
219 collision time calculation unit
220 target deceleration calculation unit
221 braking device

The invention claimed is:

1. An obstacle detection apparatus comprising:
an obstacle distance detector, disposed in a vehicle, which detects an obstacle distance between the vehicle and an obstacle around the vehicle;
an imaging device, disposed in the vehicle, which takes a road surface image of a portion around the vehicle, and outputs the road surface image;
an image transformer to transform a coordinate of the road surface image and output a result as a coordinate transform image;
a histogram generation region image extraction processor which extracts, as a histogram generation region image, an image of a predetermined region that does not reach the obstacle distance in the coordinate transform image;
a histogram calculator to calculate a histogram in the histogram generation region image;
a first running-allowed region detector which detects a first running-allowed region in which the vehicle can run, in the coordinate transform image, based on the coordinate transform image and the histogram;

an obstacle region extraction processor which extracts an obstacle region in the coordinate transform image based on the first running-allowed region; and an obstacle position detector to detect a position of the obstacle relative to the vehicle based on the obstacle region, and output the position as obstacle position information.

2. The obstacle detection apparatus according to claim 1, comprising an obstacle detection zone calculator which sets, as an obstacle detection zone, a region in which an arc, having a radius that is the obstacle distance detected by the obstacle distance detector, is widened in a radial direction and a circumferential direction so as to have a constant width, wherein the obstacle position detector detects a portion in which the obstacle detection zone and the obstacle region overlap each other, as a position of the obstacle relative to the vehicle.

3. The obstacle detection apparatus according to claim 2, comprising:

a vehicle state detector to detect a vehicle state of the vehicle;

an image storage for storing a plurality of frames of the coordinate transform images, and accumulating, as previous coordinate transform images, the coordinate transform images for a previously designated number of preceding frames; and a differential image obstacle region extraction processor which calculates a difference in the coordinate transform image based on the vehicle state, the stored coordinate transform images, and the accumulated previous coordinate transform images, and outputs a region having deviation as a differential obstacle region, wherein the obstacle position detector detects a portion in which at least two of the obstacle detection zone, the obstacle region, and the differential obstacle region overlap each other, as a position of the obstacle relative to the vehicle.

4. An automatic braking apparatus using an obstacle detection apparatus, wherein braking of the vehicle is controlled based on the obstacle position information in the obstacle detection apparatus according to claim 1.

5. The automatic braking apparatus, using the obstacle detection apparatus, according to claim 4, the automatic braking apparatus comprising:

a second running-allowed region detector to detect a second running-allowed region in which the vehicle can run, in the road surface image, based on the road surface image and the histogram;

a second obstacle region extraction processor which extracts second obstacle region in the road surface image, based on the second running-allowed region;

an obstacle image extractor which extracts an obstacle image in the road surface image based on the second obstacle region and the road surface image;

an obstacle identifier to identify the extracted obstacle image and output an identification result as obstacle identification information; and an obstacle information associater to associate the obstacle position information and the obstacle identification information with each other, wherein a target deceleration is changed according to an output from the obstacle information associater.

6. An obstacle detection method comprising;

a first step of detecting a distance between a vehicle and an obstacle around the vehicle;

a second step of obtaining a road surface image of a portion around the vehicle;

a third step of transforming a coordinate of the road surface image and outputting a result as a coordinate transform image;

a fourth step of calculating a histogram in an image of a predetermined region that does not reach an obstacle distance, in the coordinate transform image;

a fifth step of extracting a running-allowed region in which the vehicle can run, in the coordinate transform image, based on the coordinate transform image and the histogram;

a sixth step of extracting an obstacle region based on the running-allowed region for the vehicle; and a seventh step of detecting a position of the obstacle relative to the vehicle, based on the obstacle region.

7. The obstacle detection method according to claim 6, wherein, in the seventh step, a portion in which the obstacle region overlaps an obstacle detection zone in which an arc, having a radius that is the obstacle distance at a position distant over the obstacle distance, is widened in a radial direction and a circumferential direction so as to have a constant width, is detected as a position of the obstacle relative to the vehicle.

8. The obstacle detection method according to claim 7, wherein, in the seventh step, a portion in which at least two of a region in which deviation as a difference between a previous coordinate transform image and a current coordinate transform image occurs, the obstacle detection zone, and the obstacle region overlap each other is detected as a position of the obstacle relative to the vehicle.

9. An automatic braking method using an obstacle detection method, wherein braking of the vehicle is controlled based on a position of the obstacle detected in the obstacle detection method according to claim 6.

10. The automatic braking method, using the obstacle detection method, according to claim 9, the automatic braking method further comprising:

a step of extracting an obstacle image in the road surface image based on the road surface image and the histogram; and a step of identifying the extracted obstacle image, wherein a target deceleration in automatic braking is changed based on the identified obstacle image and the position of the obstacle having been detected.

11. An automatic braking apparatus using an obstacle detection apparatus, wherein braking of the vehicle is controlled based on the obstacle position information in the obstacle detection apparatus according to claim 2.

12. An automatic braking apparatus using an obstacle detection apparatus, wherein braking of the vehicle is controlled based on the obstacle position information in the obstacle detection apparatus according to claim 3.

13. An automatic braking method using an obstacle detection method, wherein braking of the vehicle is controlled based on a position of the obstacle detected in the obstacle detection method according to claim 7.

14. The automatic braking method, using the obstacle detection method, according to claim 13, the automatic braking method further comprising:

a step of extracting an obstacle image in the road surface image based on the road surface image and the histogram; and a step of identifying the extracted obstacle image, wherein a target deceleration in automatic braking is changed based on the identified obstacle image and the position of the obstacle having been detected.

15. An automatic braking method using an obstacle detection method, wherein braking of the vehicle is controlled based on a position of the obstacle detected in the obstacle detection method according to claim 8.

16. The automatic braking method, using the obstacle detection method, according to claim 15, the automatic braking method further comprising:

a step of extracting an obstacle image in the road surface image based on the road surface image and the histogram; and a step of identifying the extracted obstacle image, wherein a target deceleration in automatic braking is changed based on the identified obstacle image and the position of the obstacle having been detected.

* * * * *